(12) United States Patent
Matsumoto

(10) Patent No.: US 8,699,463 B2
(45) Date of Patent: Apr. 15, 2014

(54) BASE STATION APPARATUS AND MANAGEMENT SERVER

(75) Inventor: Hiroyuki Matsumoto, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 166 days.

(21) Appl. No.: 13/392,062

(22) PCT Filed: Aug. 27, 2010

(86) PCT No.: PCT/JP2010/005308
§ 371 (c)(1),
(2), (4) Date: Feb. 23, 2012

(87) PCT Pub. No.: WO2011/024476
PCT Pub. Date: Mar. 3, 2011

(65) Prior Publication Data
US 2012/0157099 A1    Jun. 21, 2012

(30) Foreign Application Priority Data

Aug. 27, 2009  (JP) ................................. 2009-196985
Aug. 27, 2009  (JP) ................................. 2009-197323

(51) Int. Cl.
*H04W 4/00*    (2009.01)

(52) U.S. Cl.
USPC ........ 370/331; 455/435.1; 455/436; 455/437; 455/438; 455/439; 455/440; 455/441; 455/442; 455/443; 455/444; 455/448; 455/449; 455/450; 455/456.1; 455/456.5; 455/456.6; 370/328; 370/329; 370/330

(58) Field of Classification Search
USPC .............. 455/435.1, 436–444, 448, 449, 450, 455/456.1, 456.5, 456.6; 370/328–331
See application file for complete search history.

(56) References Cited

U.S. PATENT DOCUMENTS

| 2009/0196253 | A1* | 8/2009 | Semper | 370/331 |
| 2009/0252073 | A1* | 10/2009 | Kim et al. | 370/311 |
| 2010/0056184 | A1* | 3/2010 | Vakil et al. | 455/456.5 |
| 2010/0113035 | A1* | 5/2010 | Eskicioglu et al. | 455/444 |

FOREIGN PATENT DOCUMENTS

| JP | 2002-152129 A | 5/2002 |
| JP | 2002-204478 A | 7/2002 |
| JP | 2009-159335 A | 7/2009 |
| WO | 2009/022533 A1 | 2/2009 |

OTHER PUBLICATIONS

International Search Report; PCT/JP2010/005308; Nov. 30, 2010.
(Continued)

*Primary Examiner* — Olumide T Ajibade Akonai
(74) *Attorney, Agent, or Firm* — Studebaker & Brackett PC

(57) ABSTRACT

A femtocell base station 10a suspends transmission and reception of radio waves to and from a radio communication terminal 30 of an accommodation object when the radio communication terminal 30 is not in the neighborhood of the femtocell base station 10a. The femtocell base station 10a determines whether the radio communication terminal 30 is in the neighborhood of the femtocell base station 10a based on information of a UATI update notification provided through another base station in communication with the radio communication terminal 30 and, when the radio communication terminal 30 is in the neighborhood of the femtocell base station 10a, starts receiving the radio waves from the radio communication terminal 30.

10 Claims, 38 Drawing Sheets

(56) References Cited

OTHER PUBLICATIONS

An Office Action: "Notice of Reason for Rejection," issued by the Japanese Patent Office on Aug. 13, 2013, which corresponds to Japanese Patent Application No. 2009-196985 and is related to U.S. Appl. No. 13/392,062; with Concise Explanation.

An Office Action: "Notice of Reason for Rejection," issued by the Japanese Patent Office on Aug. 13, 2013, which corresponds to Japanese Patent Application No. 2009-197323 and is related to U.S. Appl. No. 13/392,062; with Concise Explanation.

* cited by examiner

FIG. 8

| UATI UPDATE NOTIFICATION |
|---|
| BASE STATION INFORMATION |
| ColorCode |
| SectorID |
| TERMINAL IDENTIFICATION INFORMATION |
| UATI |

FIG. 12

| BIT | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| MI | 1 | 1 | 1 | 1 | 1 | 1 | 1 | 1 | 1 | 1 | A0 | A31 | A22 | A4 | A26 | A17 | A8 | A30 | A21 | A12 | A3 | A25 | A16 | A7 | A29 | A20 | A11 | A2 | A24 | A15 | A6 | A28 | A19 | A10 | A1 | A23 | A14 | A5 | A27 | A18 | A9 |

FIG. 13

| BIT | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| M0 | 1 | 1 | 1 | 1 | 1 | 1 | 1 | 1 | A31 | A0 | A3 | A22 | A4 | A26 | A17 | A6 | A30 | A21 | A12 | A3 | A29 | A20 | A11 | A2 | A24 | A15 | A6 | A28 | A19 | A10 | A1 | A23 | A14 | A5 | A27 | A18 | A9 | C |

| UATI UPDATE NOTIFICATION | |
|---|---|
| BASE STATION INFORMATION | |
| ColorCode | |
| SectorID | |
| TERMINAL IDENTIFICATION INFORMATION | |
| UATI | |

FIG. 22

| UATI ACQUISITION NOTIFICATION |
|---|
| MACROCELL BASE STATION COLOR CODE |
| TERMINAL IDENTIFICATION INFORMATION |
| UATI |

FIG. 32

| UATI UPDATE NOTIFICATION | | |
|---|---|---|
| | BASE STATION INFORMATION | |
| | ColorCode | |
| | SectorID | |
| TERMINAL IDENTIFICATION INFORMATION | | |
| UATI | | |

FIG. 33

| | UATI ACQUISITION NOTIFICATION (NEIGHBORING) | |
|---|---|---|
| | MACROCELL BASE STATION COLOR CODE | |
| | TERMINAL IDENTIFICATION INFORMATION | |
| | UATI | |

FIG. 34

| | UATI ACQUISITION NOTIFICATION (DISTANT) | |
|---|---|---|
| | MACROCELL BASE STATION COLOR CODE | |
| | TERMINAL IDENTIFICATION INFORMATION | |
| | UATI | |

US 8,699,463 B2

BASE STATION APPARATUS AND MANAGEMENT SERVER

CROSS REFERENCE TO RELATED APPLICATIONS

This application claims priority to and the benefit of Japanese Patent Application No. 2009-196985 (filed on Aug. 27, 2009) and Japanese Patent Application No. 2009-197323 (filed on Aug. 27, 2009), the entire contents of which are incorporated herein by reference.

TECHNICAL FIELD

The present invention relates to a base station apparatus to communicate with a radio communication terminal in a narrow area and to a management server.

BACKGROUND ART

In a radio communication system of late years, a base station having a communication area called femtocell (Femtocell), which is much smaller than conventional communication areas, has been suggested. A cell of a conventional mobile phone, that is the communication area of one base station is around one to a few km in radius, whereas the communication area of the femtocell is as narrow as for example, inside of a house or a small office, in size of around 10 m at most. Since the femtocell provides a service area in a pinpoint manner and allows for personal installment, it is expected that the femtocell will become popular in the years ahead.

Here, a conventional radio communication system having a macrocell and the femtocell will be described with reference to FIG. 38 and FIG. 39.

Each of the conventional radio communication systems illustrated in FIG. 38 and FIG. 39 includes femtocell base stations 90a and 90b having femtocells 9a and 9b as respective communication areas, a macrocell base station 20 having a macrocell 8 as the communication area including both of the femtocells, and a radio communication network 26 in conformity with "CDMA2000 1xEV-DO" and connected to the macrocell base station 20.

Each of the conventional radio communication systems illustrated in FIG. 38 and FIG. 39 further includes routers 23 and 22 respectively connected to the femtocell base stations 90a and 90b, a public network 92 connected to the routers, a gateway 24 connected to the public network 92 and the radio communication network 26, and a management server 91 connected to the gateway 24. The management server 91 has an OAM (Operation And Maintenance) function and manages, for example, information about the femtocells 9a and 9b and the femtocell base stations 90a and 90b.

In addition, a radio communication terminal 30 is authorized to communicate with the femtocell base station 90a. Now, it is assumed that, while the femtocell base station 90a is in communication with the radio communication terminal 30, (1) the radio communication terminal 30 moves out of the femtocell 9a and (2) performs handoff to the macrocell base station 20. Although there is no terminal authorized to communicate within the femtocell 9a, (3) the femtocell base station 90a continues to transmit radio waves.

For example, there may be a case such that, even though a user of the radio communication terminal 30 is at work or at school and there is no user in the house where the femtocell base station 90a is installed, the femtocell base station 90a continuously transmits the radio waves. In such a condition, it is a waste of power for the femtocell base station 90a to continuously transmit the radio waves to the authorized radio communication terminal 30.

In order to address such a problem, Patent Document 1 suggests a radio communication method in which the base station suspends a transmission function when there is no communication for a predetermined period and, when the radio communication terminal transmits a transmission initiation request signal to the base station in order to make a phone call in the predetermined period, restarts the transmission function upon reception of the signal to enable a communication with the radio communication terminal, such that the base station reduces power consumption as long as stopping the transmission function.

RELATED ART DOCUMENT

Patent Document

Patent Document 1: Japanese Patent Laid-Open No. 2002-152129

SUMMARY OF INVENTION

Technical Problem

Although the technique disclosed in Patent Document 1 set forth above suspends the transmission function of the base station when there is no communication in the predetermined period in order to reduce the power consumption of the base station, it is preferable to suspend a reception function as well as the transmission function in order to further reduce the power consumption of the base station. However, when suspending the reception function, it is difficult for the base station to receive the transmission initiation request signal from the radio communication terminal and restart the transmission function, and thus it has been difficult for the base station to reduce the power consumption by suspending the reception function.

Accordingly, it is an object of the present invention, taking in consideration such a problem, to provide a base station apparatus and a management server that enable more effective power consumption than ever.

Solution to Problem

In order to achieve the above object, a base station apparatus, according to the present invention, for a narrow-area base station communicating in a narrow area within a wide area allowing for a communication with a wide-area base station includes: a radio communication reception unit configured to receive radio waves from a radio communication terminal of an accommodation object; a control unit configured to control reception of the radio waves by the radio communication reception unit; a wired communication unit configured to communicate with a server managing the base station; and a determination unit configured to determine whether the radio communication terminal of the accommodation object in communication with another base station is within an area of the same radio area information as the self base station based on the radio area information acquired through the wired communication unit, wherein the control unit controls the radio communication reception unit to start receiving the radio waves from the radio communication terminal when the determination unit determines that the radio communication terminal is within the area of the same radio area information as the self base station.

It is preferable that the control unit acquires the radio area information from the radio communication terminal of the accommodation object via the another base station in communication with the radio communication terminal through the wired communication unit.

It is also preferable that the control unit acquires the radio area information from the server managing the another base station in communication with the radio communication terminal of the accommodation object through the wired communication unit.

It is also preferable that the control unit acquires the radio area information through the wired communication unit when a location of the radio communication terminal of the accommodation object is registered.

It is also preferable that, when the determination unit determines that the radio communication terminal is not within the area of the same radio area information as the base station of itself, the control unit controls the radio communication reception unit to suspend reception of the radio waves from the radio communication terminal.

In addition, a management server configured to manage a narrow-area base station capable of communicating in a narrow area within a wide area allowing for a communication with a wide-area base station includes: a control unit configured to control a correspondence relationship between a radio communication terminal and the narrow-area base station accommodating the radio communication terminal; a wired communication unit configure to communicate with the wide-area base station and the narrow-area base station; and a determination unit configured to determine whether the radio communication terminal in communication with the wide-area base station is within an area of the same radio area information as the narrow-area base station based on the radio area information acquired from the wide-area base station, wherein the control unit, when the determination unit determines that the radio communication terminal is within the area of the same radio area information as the narrow-area base station, notifies the narrow-area base station that the radio communication terminal is within the area of the same radio area information as the narrow-area base station such that the narrow-area base station starts receiving radio waves from the radio communication terminal.

It is preferable that the determination unit determines that the radio communication terminal of the accommodation object of a plurality of narrow-area base stations is within the area of the same radio area information as the narrow-area base station.

It is also preferable that the control wait acquires the radio area information from the wide-area base station through the wired communication unit when the location of the radio communication terminal is registered.

In addition, a base station apparatus for a narrow-area base station capable of communicating in a narrow area within a wide area allowing for a communication with a wide-area base station includes: a radio communication reception unit configured to receive radio waves from a radio communication terminal of an accommodation object; a control unit configured to control reception of the radio waves by the radio communication reception unit; and a wired communication unit configured to communicate with a management server configured to manage the self base station, wherein the control unit controls the radio communication reception unit to suspend reception of the radio waves when the location of the radio communication terminal of the accommodation object is not registered and controls the radio communication reception unit to start receiving the radio waves from the radio communication terminal when being notified from the management server through the wired communication unit that the radio communication terminal is within the area of the same radio area information as the base station of itself.

It is preferable that the control unit, when being notified from the management server through the wired communication unit that the radio communication terminal is not within the area of the same radio area information as the base station of itself, controls the radio communication reception unit to suspend reception of the radio waves from the radio communication terminal.

Effect of the Invention

According to the present invention, since a femtocell base station starts monitoring the radio waves transmitted from the radio communication terminal when the radio communication terminal comes close to a femtocell, more effective power consumption is allowed in comparison with a case that the radio waves are monitored even though the radio communication terminal is distant from the femtocell.

BRIEF DESCRIPTION OF DRAWINGS

FIG. 8 is a diagram illustrating a UATI update notification;

FIG. 12 is a diagram illustrating an example MI;

FIG. 13 is a diagram illustrating an example of MQ;

FIG. 20 is a diagram illustrating information in the UATI update notification;

FIG. 22 is a diagram illustrating information in a UATI acquisition notification;

FIG. 32 is a diagram illustrating information in the UATI update notification;

FIG. 33 is a diagram illustrating information in a UATI acquisition notification (neighboring);

FIG. 34 is a diagram illustrating information in a UATI acquisition notification (distant);

DESCRIPTION OF EMBODIMENTS

Embodiments of the present invention will be described with reference to the accompanying drawings.

First Embodiment

Figure 1:
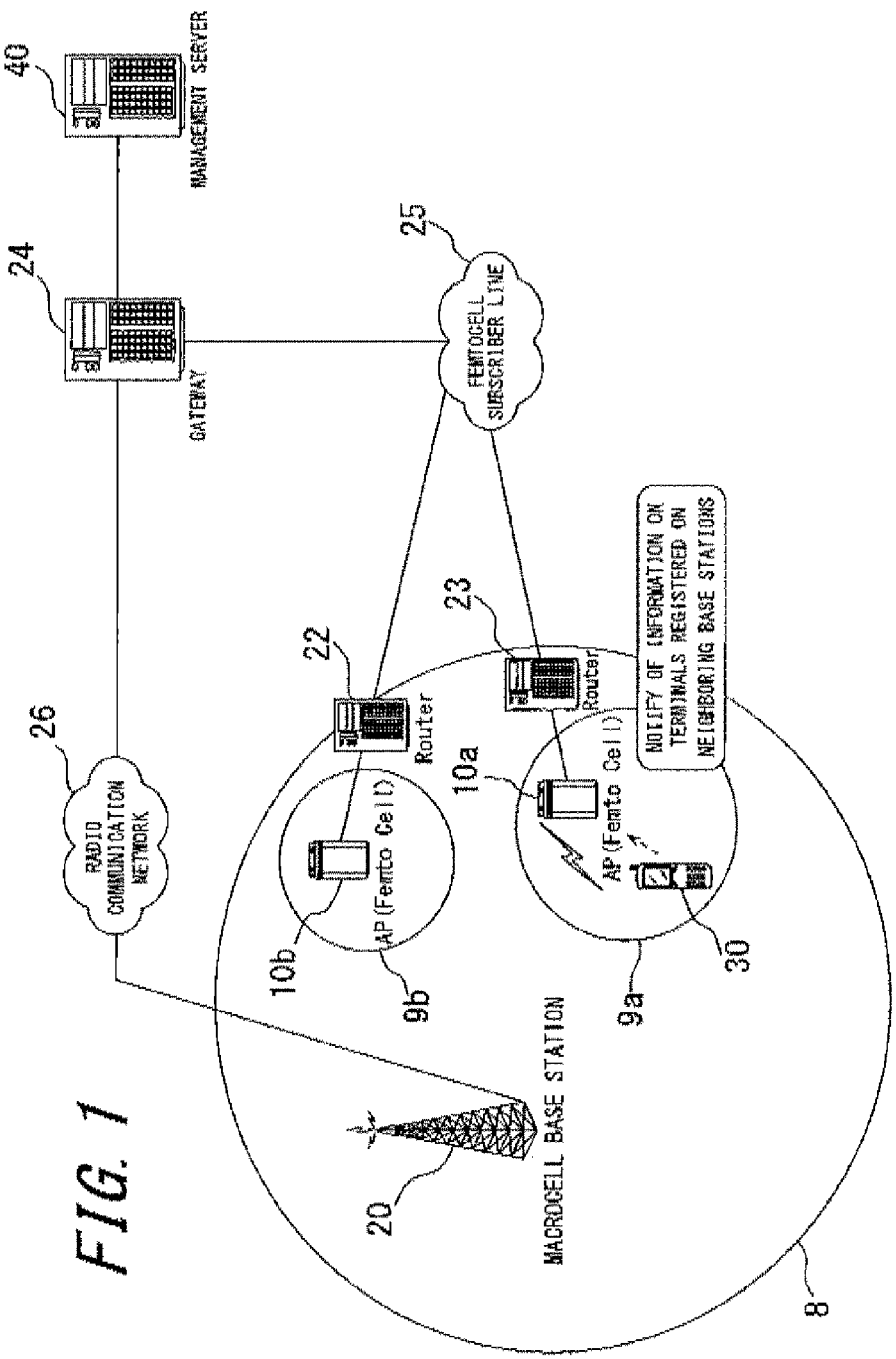
FIG. 1 is a configuration diagram of a radio communication system according to a first embodiment of the present invention.

FIG. 1 is a configuration diagram of a radio communication system according to a first embodiment of the present invention. The radio communication system illustrated in FIG. 1 includes femtocell base stations 10a and 10b having femtocells 9a and 9b as respective communication areas, a macrocell base station 20 having a macrocell 8 (wide area) as the communication area including the femtocells 9a and 9b (narrow areas), and a radio communication network 26 connected to the macrocell base station 20. According to the present embodiment, the radio communication network 26 is in conformity with "CDMA2000 1xEV-DO". When distinguishing between the femtocell base stations, the femtocell base stations are referred to as the femtocell base station 10a or the femtocell base station 10b. Otherwise, the femtocell base stations are referred to as femtocell base stations 10.

The radio communication system illustrated in FIG. 1 further includes routers 23 and 22 respectively connected to the femtocell base stations 10a and 10b, a femtocell subscriber line 25 connected to the routers 23 and 22, a gateway 24 connected to the femtocell subscriber line 25 and the radio communication network 26, and a management server 40 connected to the gateway 24. The management server 40 has an OAM (Operation And Maintenance) function and manages, for example, information about the femtocells 9a and 9b and the femtocell base stations 10a and 10b.

In addition, the radio communication terminal 30 is authorized to communicate with the femtocell base station 10a and thus regarded as an accommodation object of the femtocell base station 10a.

Figure 2:
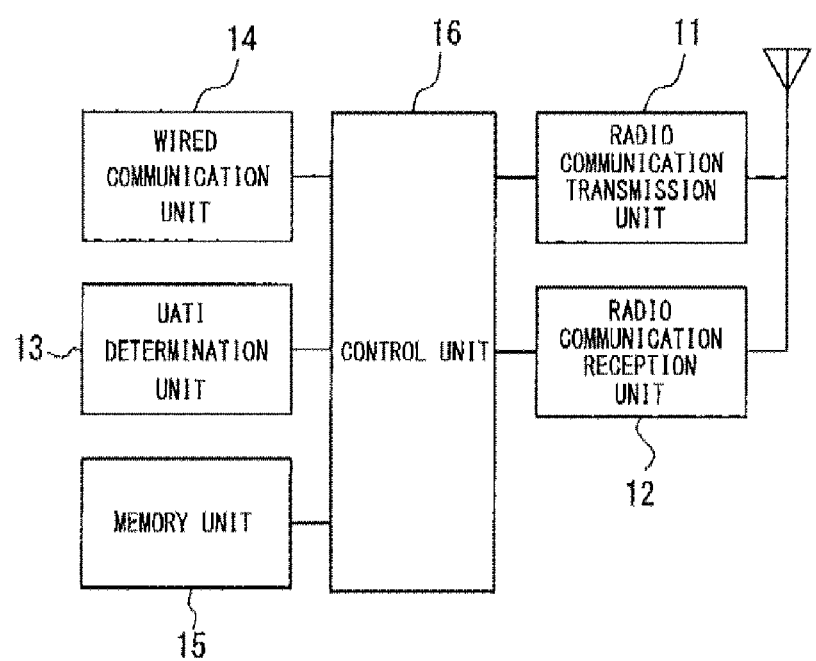
FIG. 2 is a block diagram of a femtocell base station.

FIG. 2 is a block diagram of the femtocell base station. The femtocell base station 10 has a configuration including a radio communication transmission unit 11, a radio communication reception unit 12, a UATI (Unicast Access terminal identifier) determination unit 13, a wired communication unit 14, a memory unit 15 and a control unit 16. The radio communication transmission unit 11 transmits radio waves to a radio communication terminal of the accommodation object. The radio communication reception unit 12 receives the radio waves from the radio communication terminal of the accommodation object. The wired communication unit 14 communicates with the macrocell base station 20 and the management server 40. The UATI determination unit 13 determines whether the radio communication terminal in communication with the macrocell base station 20 is in an area of the same radio area information (Color Code) as the femtocell base station 10, based on the radio area information acquired through the wired communication unit 14.

The memory unit 15 may be a storage medium such as a flash memory or a hard disk. The control unit 16 may be a CPU or the like.

The control unit 16 pre-registers on the memory unit 15 identification information (ESN: Electric Serial Number and the like) of the radio communication terminal of the accommodation object. The control unit 16 also registers on the memory unit 15 neighboring base station information of the macrocell base station 20 in the neighborhood of the femtocell base station 10 of itself.

The control unit 16 controls transmission of the radio waves by the radio communication transmission unit 11 and monitoring of the radio waves by the radio communication reception unit 12. When the UATI determination unit 13 determines that the radio communication terminal of the accommodation object is within the area of the same radio area information as the femtocell base station 10, the control unit 16 controls the radio communication reception unit 12 to start receiving the radio waves from the radio communication terminal. On the other hand, when the UATI determination unit 13 determines that the radio communication terminal of the accommodation object is not within the area of the same radio area information as the femtocell base station 10 and that there is no radio communication terminals having registered their locations (being in a standby state), the control unit 16 controls the radio communication reception unit 12 to suspend reception of the radio waves from the radio communication terminal.

Figure 3:
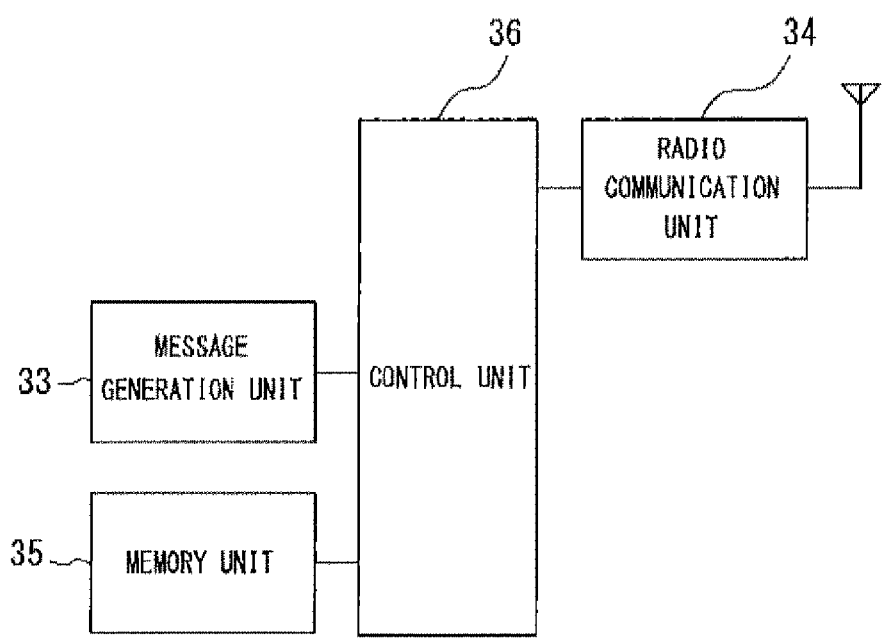
FIG. 3 is a block diagram of a radio communication terminal.

FIG. 3 is a block diagram of the radio communication terminal. The radio communication terminal 30 has a configuration including a message generation unit 33, a radio communication unit 34, a memory unit 35 and a control unit 36. When the radio communication terminal 30 acquires UATI from the macrocell base station (when having registered the location), the message generation unit 33 generates a message to notify the femtocell base station 10 of UATI update via the radio communication network 26. The radio communication unit 34 is an interface for a communication with the femtocell base station 10 and the macrocell base station 20. The memory unit 35 may be the storage medium such as the hard disk or the flash memory. The control unit 36 may be the CPU or the like.

Figure 4:
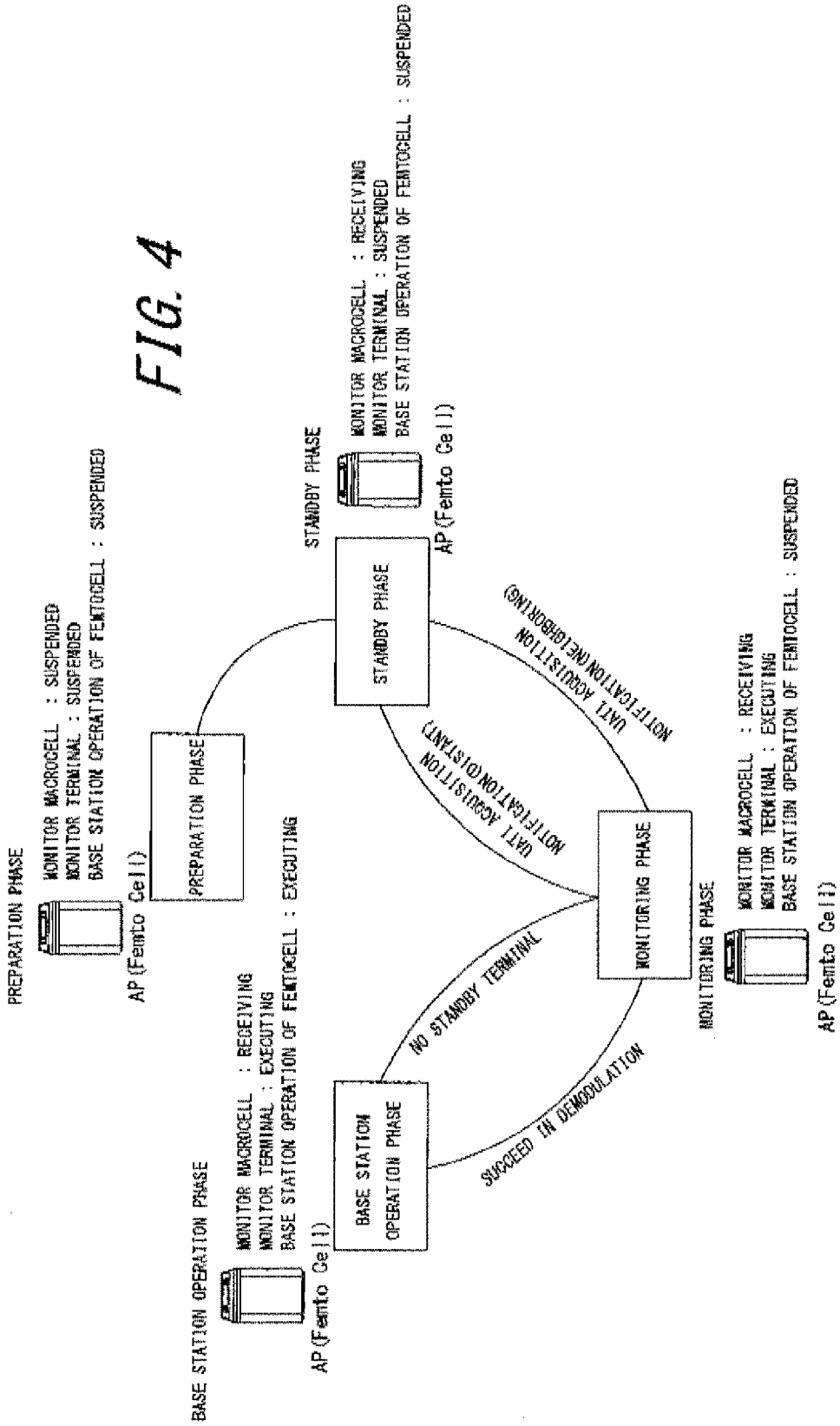
FIG. 4 is a diagram illustrating a transition of a state of the femtocell base station.

Next, operations of the femtocell base station according to the first embodiment will be described. FIG. 4 is a diagram illustrating a transition of a state of the femtocell base station. As illustrated in FIG. 4, the operations of the femtocell base station according to the first embodiment are classified into four phases; a preparation phase, a standby phase, a monitoring phase and a base station operation phase.

[Preparation Phase]

At the preparation phase, as illustrated in FIG. 1, the femtocell base station 10a acquires and registers the identification information (ESN and the like) of the radio communication terminal 30 authorized to communicate with the femtocell base station 10a. In addition, the femtocell base station 10a informs the management server 40 of the identification information (ESN and the like) of the radio communication terminal 30. Further, the femtocell base station 10a registers the neighboring base station information of the macrocell base station 20 in the neighborhood of the femtocell base station 10a on the memory unit 15.

Figure 5:
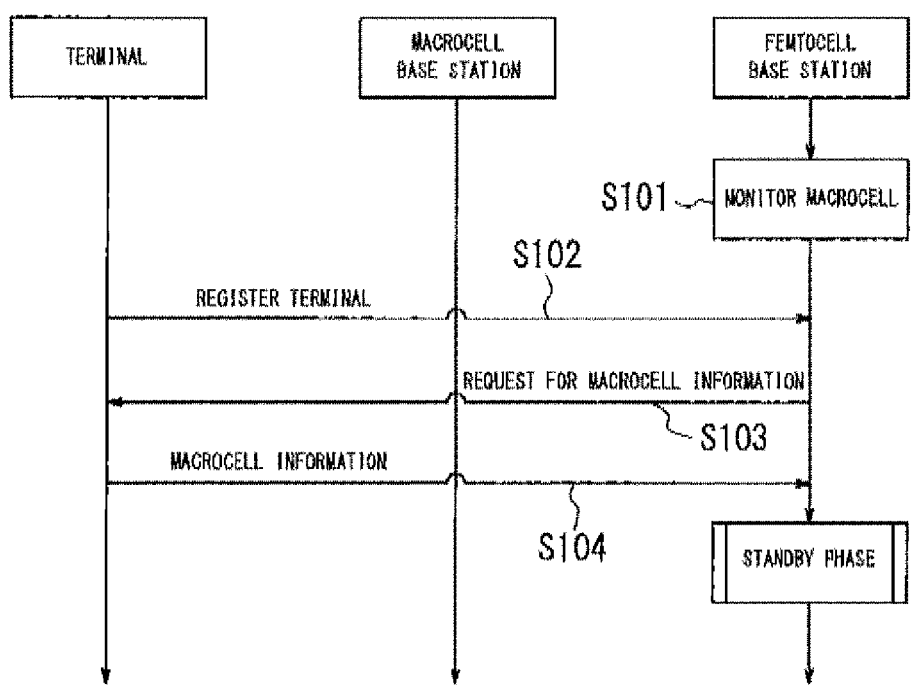
FIG. 5 is a sequence diagram illustrating details of operations performed when the femtocell base station is at a preparation phase.

Next, a sequence diagram illustrating details of operations performed when the femtocell base station is at the preparation phase is illustrated in FIG. 5.

The femtocell base station 10a, by using its function to monitor the macrocell base stations and neighboring femtocell base stations, acquires notification information of the macrocell base stations in the neighborhood of the femtocell base station 10a and that of the neighboring femtocell base stations (S101). In addition, the femtocell base station 10a acquires the identification information (ESN and the like) of the authorized radio communication terminal 30 and registers it (S102). Now, the radio communication terminal 30 is regarded as the accommodation object of the femtocell base station 10a. Further, the femtocell base station 10a may require the radio communication terminal 30 of the notification information of the macrocell base station 20 in the neighborhood of the femtocell base station 10a and that of the neighboring femtocell base station (S103) and acquire notification information of the neighboring base station from the radio communication terminal 30 (S104). Examples of the notification information are Band Class, Channel and PN (Pseudo random noise) for monitoring, and Color Code and Sector ID for demodulation. The femtocell base station 10 performs a time synchronization with the neighboring macrocell base station 20 by using GPS (Global Positioning System) and NTP (Network Time Protocol), so as to be in sync therewith in demodulation.

[Standby Phase]

Figure 6:
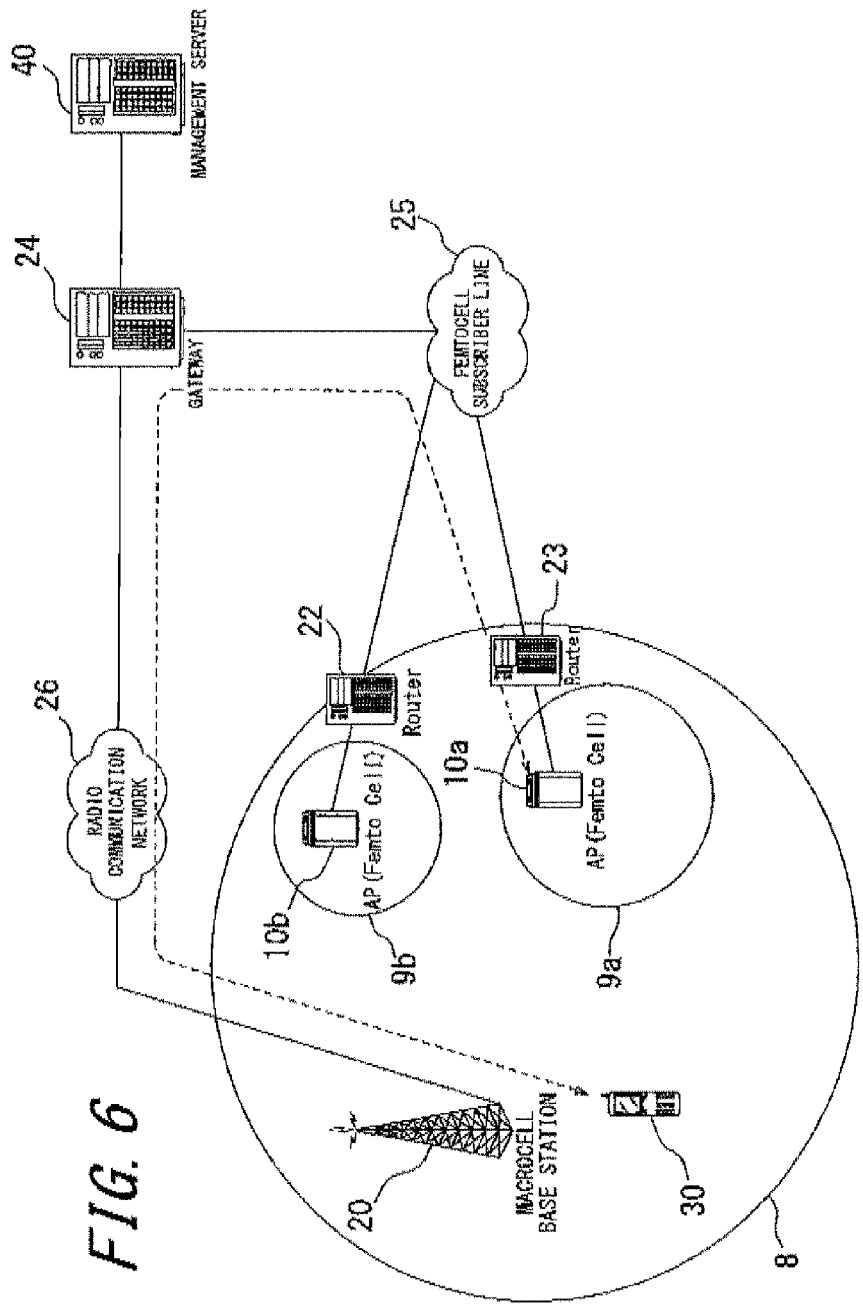
FIG. 6 is a diagram illustrating operations of the radio communication system when the femtocell base station is at a standby phase.

FIG. 6 is a diagram illustrating operations of the radio communication system when the femtocell base station is at the standby phase. At the standby phase, the femtocell base station 10a suspends the radio communication transmission unit 11 and the radio communicating reception unit 12 and activates the wired communication unit 14, thus being at a state to wait for a UATI acquisition notification.

When the radio communication terminal 30 acquires the UATI (Unicast Access terminal identifier) from the macrocell base station 20, the radio communication terminal 30 provides the UATI update notification to the femtocell base station 10a via the radio communication network. The femtocell base station 10a receives the UATI update notification, and, if Color Code (information to identify a radio communication area: radio area information) included in information of the UATI update notification is Color Code of the macrocell base station in the neighborhood of the femtocell base station 10a, the femtocell base station 10a proceeds to the monitoring phase described below.

Figure 7:
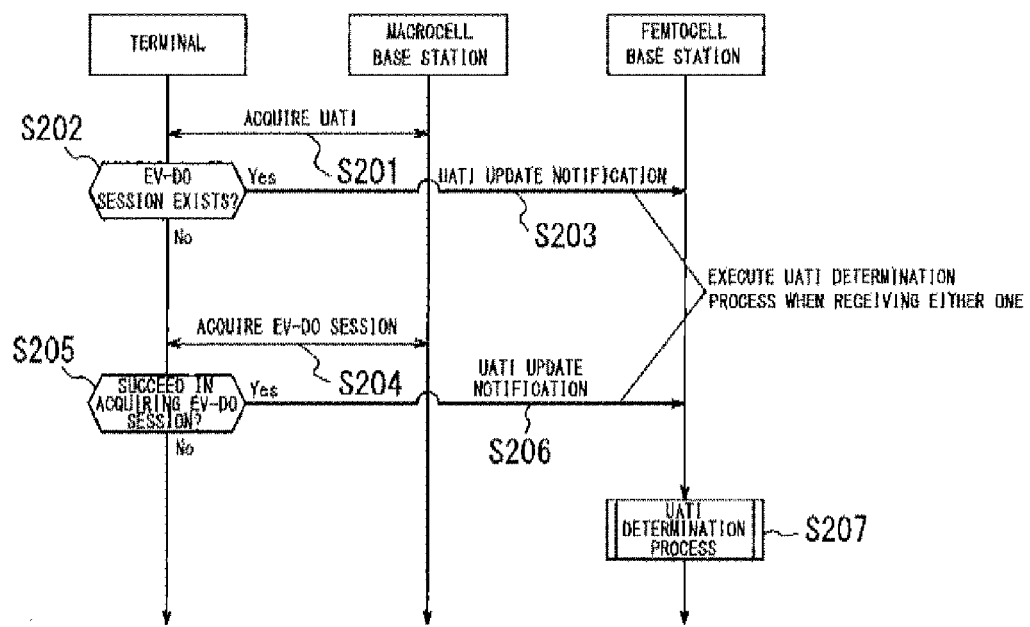
FIG. 7 is a sequence diagram illustrating details of operations performed when the femtocell base station is at the standby phase.

Next, a sequence diagram illustrating details of operations performed when the femtocell base station is at the standby phase is illustrated in FIG. 7.

The radio communication terminal 30 acquires the UATI from the macrocell base station 20 (S201), and, if there is an EV-DO session with the macrocell base station 20 ("Yes" at step S202), or, if the radio communication terminal 30 requests for the EV-DO session (S204) and succeeds in acquiring the EV-DO session with the macrocell base station 20 ("Yes" at S205), the radio communication terminal 30 provides the UATI update notification to the femtocell base station 10a via the radio communication network 26, the gateway 24 and the femtocell subscriber line 25 (S203, S206). It is assumed that the operations at steps S201-S203 relate to location registration and the like during handoff and the operations at steps S204-S206 relate to location registration and the like. FIG. 8 illustrates the information in the UATI update notification including base station information on the macrocell base station, Color Code, Sector ID, the identification information (ESN and the like) of the radio communication terminal 30 and the UATI.

Figure 9:
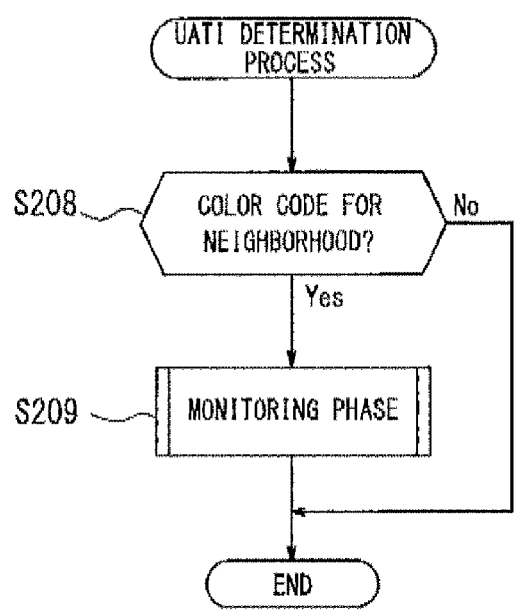
FIG. 9 is a flowchart of UATI determination processing.

The femtocell base station 10a receives the UATI update notification, and performs UATI determination processing (S207). FIG. 9 is a flowchart of the UATI determination process. Based on Color Code in the information of the UATI update notification and Color Code in the neighboring base station information registered on the memory unit 15, the femtocell base station 10a determines whether the UATI is acquired from the macrocell base station in the neighborhood of the femtocell base station 10a or the neighboring femtocell base station (S208). When the femtocell base station 10a determines that the UATI is acquired from the macrocell base station in the neighborhood of the femtocell base station 10a or the neighboring femtocell base station ("Yes" at S208), the femtocell base station 10a proceeds to the monitoring phase described below (S209). Or, when the UATI is acquired from a non-neighboring macrocell base station or femtocell base station ("No" at step S208), the femtocell base station 10a ends the UATI determination processing and remains at the standby phase.

[Monitoring Phase]

Figure 10:
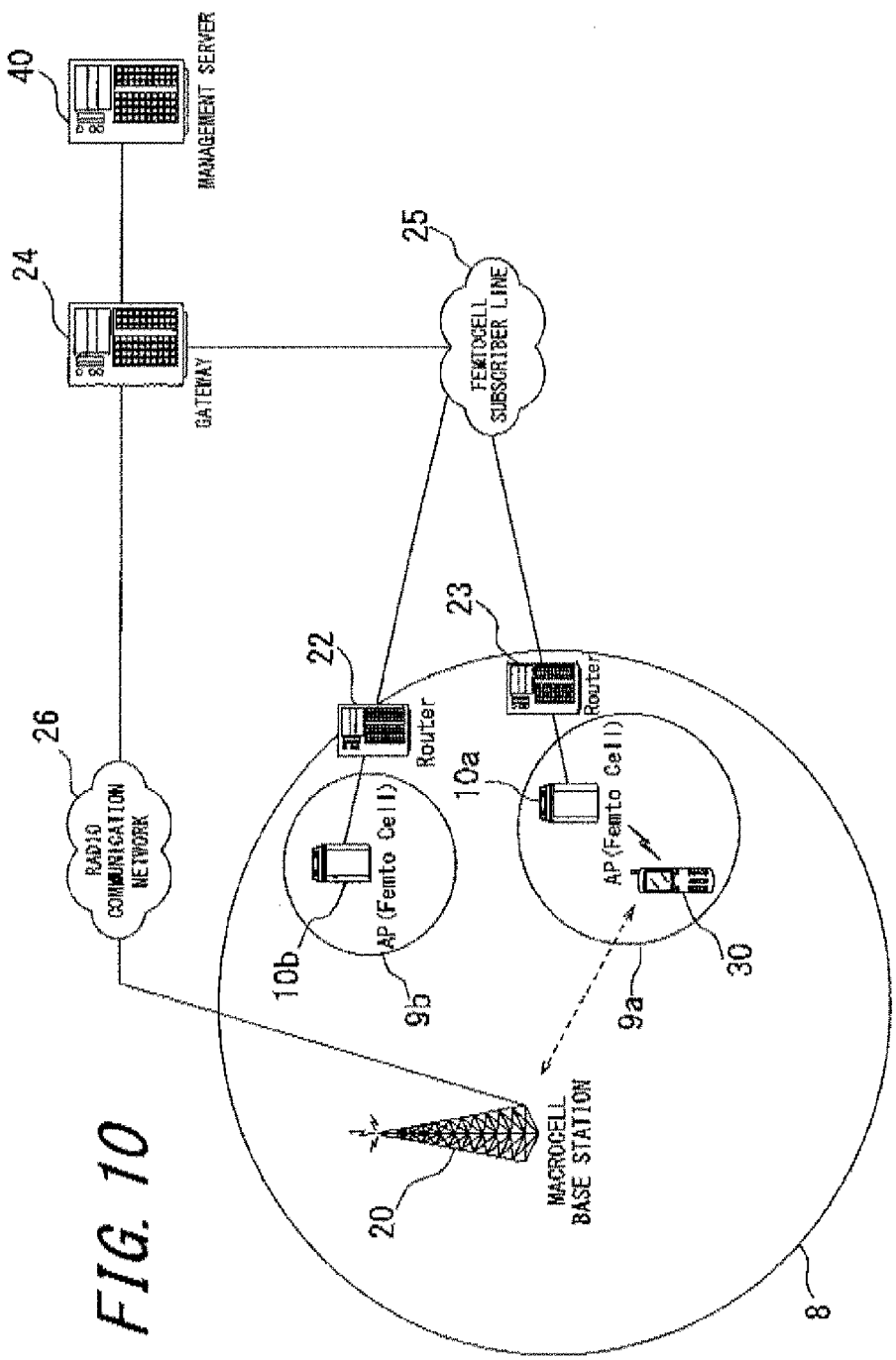
FIG. 10 is a diagram illustrating operations of the radio communication system when the femtocell base station is at a monitoring phase.

FIG. 10 is a diagram illustrating operations of the radio communication system when the femtocell base station is at the monitoring phase. At the monitoring phase, the femtocell base station 10a suspends the radio communication transmission unit 11 and activates the radio communication reception unit 12 and the wired communication unit 14. At the monitoring phase, the femtocell base station 10a activates the wired communication reception unit 12 to start monitoring the radio communication terminal 30.

Figure 11:
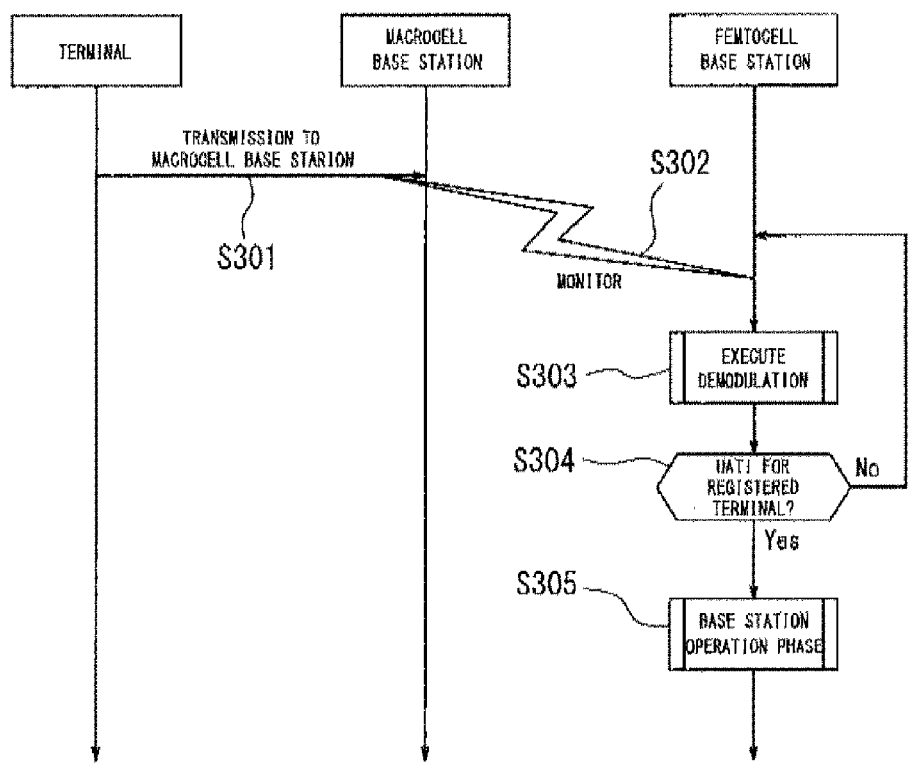
FIG. 11 is a sequence diagram illustrating details of operations performed when the femtocell base station is at the monitoring phase.

FIG. 11 is a sequence diagram illustrating details of operations performed when the femtocell base station is at the monitoring phase. As illustrated in FIG. 11, when the radio communication terminal 30 and the macrocell base station 20 are communicating with each other (S301), the femtocell base station 10a receives (monitors) the radio waves transmitted from the radio communication terminal 30 to the macrocell base station 20 (S302). Next, the femtocell base station 10a extracts the UATI from the radio waves received and executes demodulation based on the UATI (step S303). When demodulation is performed ("Yes" at S304), it means that the radio waves are transmitted from the radio communication terminal 30 authorized to communicate, and thus the femtocell base station 10a proceeds to the base station operation phase described below (S305). When demodulation is not performed ("No" at S304), the femtocell base station 10a continues to receive the radio waves from the radio communication terminal 30.

The femtocell base station 10a demodulates the radio waves transmitted from the radio communication terminal 30 based on MI and MQ. FIG. 12 illustrates an example of the MI and FIG. 13 illustrates an example of the MQ. A0-A31 in FIG. 12 and FIG. 13 represent bits of the UATI acquired.

The operations described with reference to FIG. 7 and FIG. 9 are performed at the monitoring phase as well as at the standby phase. At the monitoring phase, the monitoring phase state is remained when "Yes" at S208 in FIG. 9 applies. When "No" at S208 in FIG. 9 applies and there is no radio communication terminals having registered their locations (being in the standby state), the process transits to the standby phase.

[Base Station Operation Phase]

At the base station operation phase, the femtocell base station 10a activates the radio communication transmission unit 11, the radio communication reception unit 12 and the wired communication unit 14.

At the base station operation phase, the femtocell base station 10a activates the radio communication transmission unit 11 to start transmission of the radio waves and operates as the base station. When there is no longer the radio communication terminal 30 in the standby state, the femtocell base station 10a proceeds to the monitoring phase described above.

According to the first embodiment, as described above, when the radio communication terminal authorized to communicate is in the neighborhood of the femtocell, the femtocell base station starts monitoring the radio waves transmitted from the radio communication terminal. Accordingly, more effective power consumption is enabled than a case that the radio waves are monitored even though the radio communication terminal is distant from the femtocell.

Second Embodiment

Figure 14:
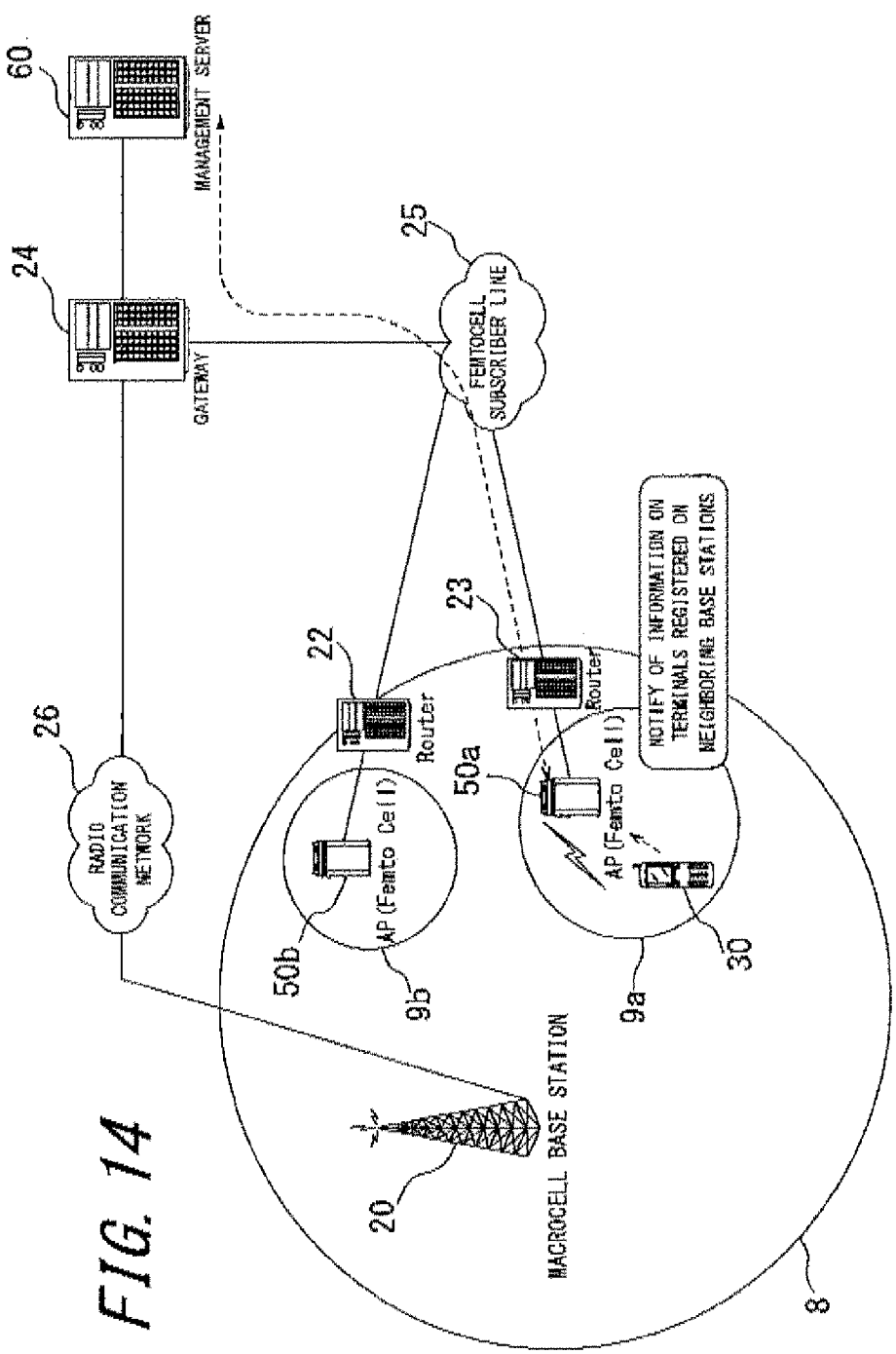
FIG. 14 is a configuration diagram of a radio communication system according to a second embodiment of the present invention.

FIG. 14 is a configuration diagram of a radio communication system according to a second embodiment of the present invention. The same elements included in the radio communication system according to the second embodiment as those of the first embodiment are given the same reference signs and descriptions thereof are omitted.

The radio communication system illustrated in FIG. 14 includes femtocell base stations 50a and 50b having the femtocells 9a and 9b as respective communication areas, the macrocell base station 20 having the macrocell 8 (wide area) as the communication area including the femtocells 9a and 9b (narrow areas), and the radio communication network 26 connected to the macrocell base station 20. According to the present embodiment, the radio communication network 26 is in conformity with "CDMA2000 1xEV-DO". To distinguish between the femtocell base stations, the femtocell base stations are referred to as the femtocell base station 50a or the femtocell base station 50b. Otherwise, the femtocell base stations are referred to as femtocell base stations 50.

The radio communication system illustrated in FIG. 14 further includes the routers 23 and 22 connected to the femtocell base stations 50a and 50b, respectively, the femtocell subscriber line 25 connected to the routers 23 and 22, the gateway 24 connected to the femtocell subscriber line 25 and the radio communication network 26, and a management server 60 connected to the gateway 24. The management server 60 has the OAM (Operation And Maintenance) function and manages, for example, information on the femtocells 9a and 9b and the femtocell base stations 50a and 50b.

In addition, the radio communication terminal 30 is authorized to communicate with the femtocell base station 50a and thus regarded as the accommodation object of the femtocell base station 50a.

Figure 15:
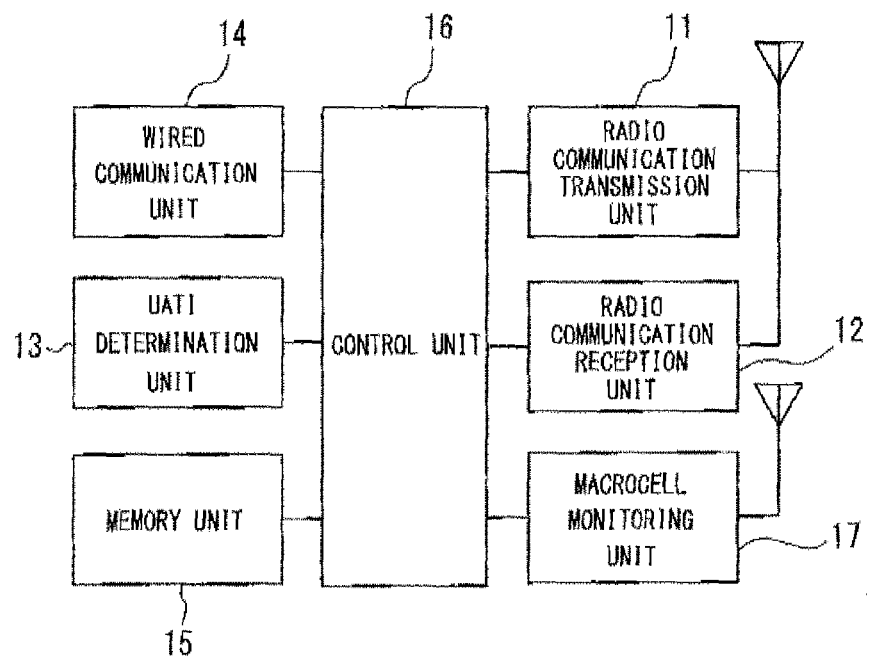
FIG. 15 is a block diagram of the femtocell base station.

FIG. 15 is a block diagram of the femtocell base station. The femtocell base station 50 has a configuration including the radio communication transmission unit 11, the radio communication reception unit 12, the UATI determination unit 13, the wired communication unit 14, the memory unit 15, the control unit 16 and a macrocell monitoring unit 17. The radio communication transmission unit 11 transmits the radio waves to the radio communication terminal of the accommodation object. The radio communication reception unit 12 receives the radio waves from the radio communication terminal of the accommodation object. The wired communication unit 14 communicates with the macrocell base station 20 and the management server 40. The UATI determination unit 13 determines whether the radio communication terminal in communication with the macrocell base station 20 is in an area of the same radio area information (Color Code) as the femtocell base station 10 based on the radio area information acquired through the wired communication unit 14. The macrocell monitoring unit 17 monitors the macrocell base station 20 in the neighborhood of the femtocell base station 10 and acquires the neighboring base station information of the macrocell base station 20.

The memory unit 15 may be the storage medium such as the flash memory or the hard disk. The control unit 16 may be the CPU or the like.

The control unit 16 pre-registers the identification information (ESN and the like) of the radio communication terminal of the accommodation object on the memory unit 15. The control unit 16 also registers the neighboring base station information of the macrocell base station 20 in the neighborhood of the femtocell base station 10 of itself on the memory unit 15.

The control unit 16 controls transmission of the radio waves by the radio communication transmission unit 11 and monitoring of the radio waves by the radio communication reception unit 12. When the UATI determination unit 13 determines that the radio communication terminal of the accommodation object is within the area having the same radio area information as the femtocell base station 10, the control unit 16 controls the radio communication reception unit 12 to start receiving the radio waves from the radio communication terminal. Or, when the UATI determination unit 13 determines that the radio communication terminal of the accommodation object is not within the area of the same radio area information as the femtocell base station 10, the control unit 16 controls the radio communication reception unit 12 to suspend reception of the radio waves from the radio communication terminal.

Figure 16:
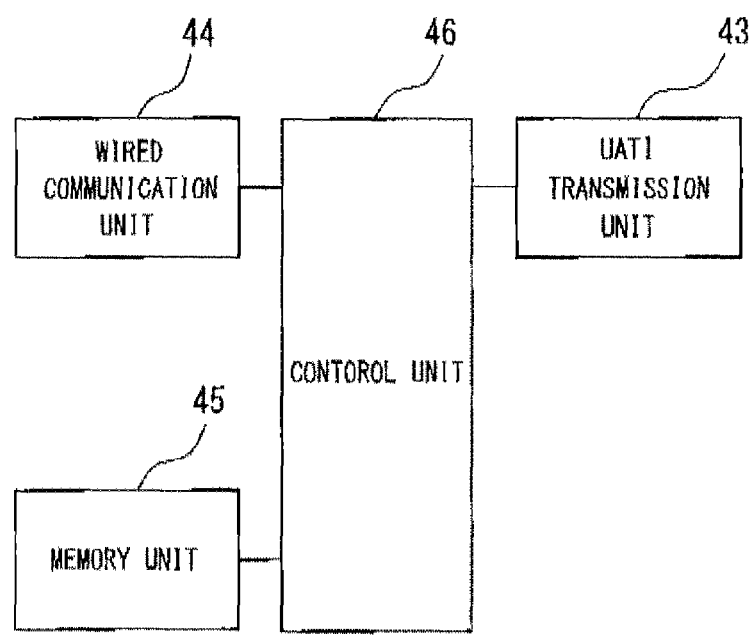
FIG. 16 is a block diagram of a management server.

FIG. 16 is a block diagram of the management server. The management server 60 is constituted by a UATI transmission unit 43, a wired communication unit 44, a memory unit 45 and a control unit 46. The UATI transmission unit 43 identifies the femtocell base station 50a, on which the radio communication terminal is registered, based on the identification information (ESN) of the radio communication terminal and transmits the UATI acquisition notification to the femtocell base station 50a. The wired communication unit 44 communicates with the macrocell base station 20 and the femtocell base station 10. The memory unit 45 may be the storage medium such as the hard disk or the flash memory. The control unit 46 may be the CPU or the like.

Next, operations of the femtocell base station according to the second embodiment will be described. In the same manner as the first embodiment, the operations of the femtocell base station according to the second embodiment are classified into the four phases: the preparation phase, the standby phase, the monitoring phase and the base station operation phase.

[Preparation Phase]

At the preparation phase, as illustrated in FIG. 14, the femtocell base station 50*a* acquires and registers the identification information (ESN and the like) of the radio communication terminal 30 which is authorized to communicate with the femtocell base station 50*a*. In addition, the femtocell base station 50*a* registers the identification information (ESN and the like) of the radio communication terminal 30 on the management server 60. The femtocell base station 50*a* also registers on the memory unit 15 the neighboring base station information of the macrocell base station 20 in the neighborhood of the femtocell base station 50*a*.

Figure 17:
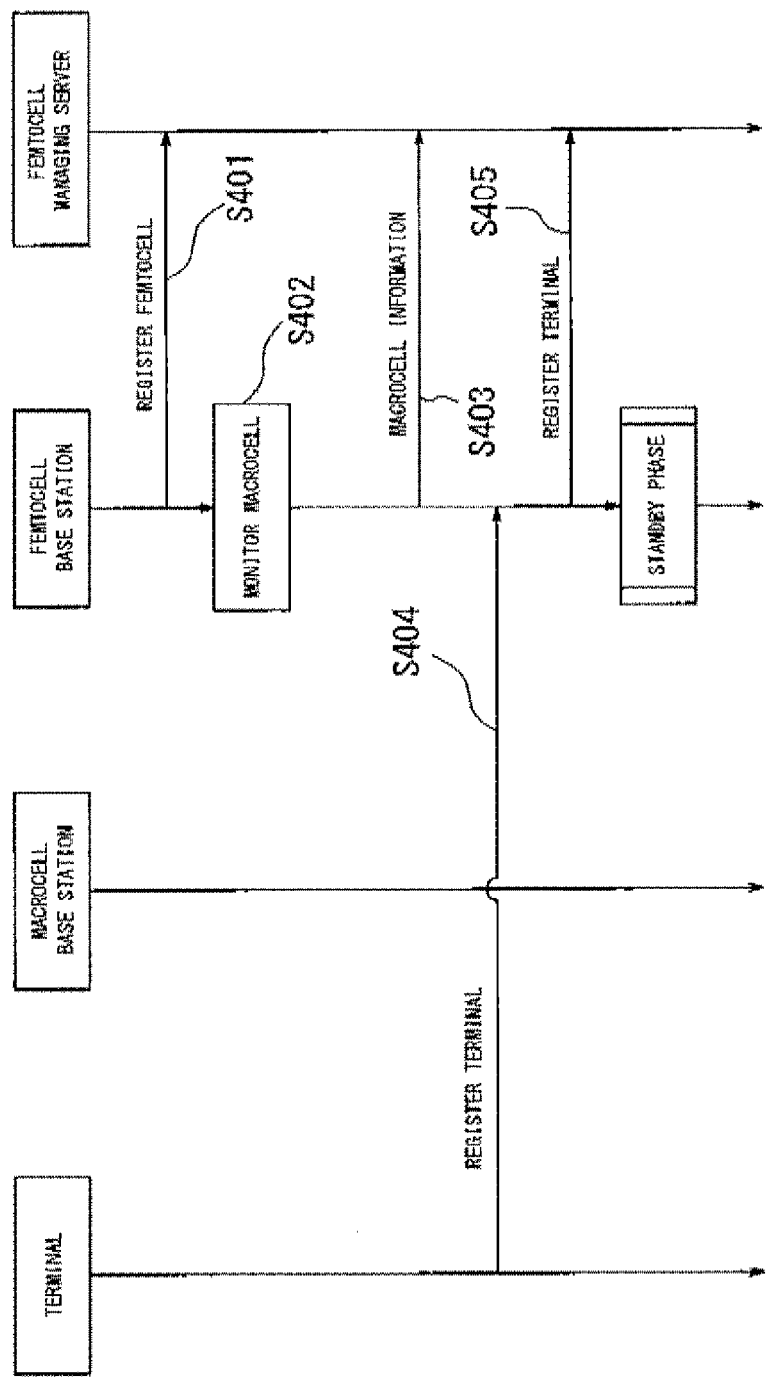
FIG. 17 is a sequence diagram illustrating details of operations performed when the femtocell base station is at the preparation phase.

Next, a sequence diagram illustrating details of operations performed when the femtocell base station is at the preparation phase is illustrated in FIG. 17.

The femtocell base station 50*a* registers femtocell registration information on the management server 60 (S401). The femtocell registration information registered on the management server 60 includes the identification information and an IP address of the femtocell base station 50*a*.

The femtocell base station 50*a* acquires the notification information of the macrocell base stations in the neighborhood of the femtocell base station 50*a* and that of the neighboring femtocell base station by using its function to monitor the macrocell base stations and the neighboring femtocell base station and registers them on the memory unit 15 (S402), as well as providing them to the management server 60 (S403). Or, the management server 60 acquires the notification information of the neighboring base station from those base stations, and the femtocell base station 50*a* acquires the notification information of the neighboring base station from the management server 60. Examples of the notification information are Band Class, Channel and PN for monitoring and Color Code and Sector ID for demodulation. The femtocell base station 50 performs time synchronization with the neighboring macrocell base station 20 by using GPS and NTP, so as to be in sync therewith in demodulation.

The femtocell base station 50*a* acquires the identification information (ESN and the like) of the radio communication terminal 30 authorized to communicate from the radio communication terminal 30 and registers it (S404). Now, the radio communication terminal 30 is regarded as the accommodation object of the femtocell base station 50*a*. The femtocell base station 50*a* also registers the identification information (ESN and the like) of the registered radio communication terminal 30 on the management server 60 (S405). At this time, the management server 60 associates the identification information of the radio communication terminal 30 and the femtocell base station 50*a*.

[Standby Phase]

Figure 18:
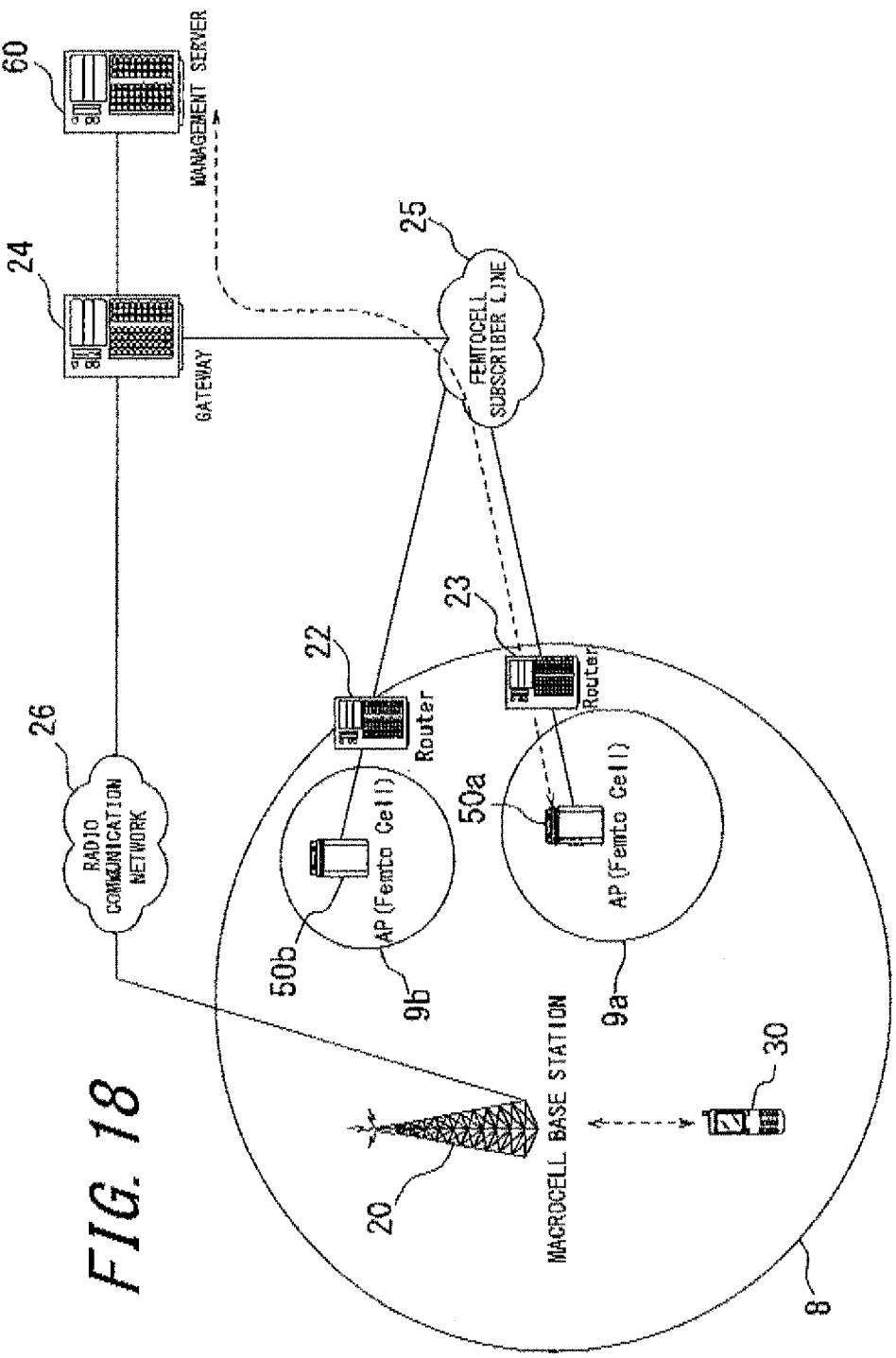
FIG. 18 is a diagram illustrating operations of the radio communication system when the femtocell base station is at the standby phase.

FIG. 18 is a diagram illustrating operations of the radio communication system when the femtocell base station is at the standby phase. At the standby phase, the femtocell base station 50*a* suspends the radio communication transmission unit 11 and the radio communication reception unit 12 and activates the wired communication unit 14, thus being at a state to wait for the UATI acquisition notification.

When the management server 60 acquires the information on the UATI, acquired by the radio communication terminal 30, through a notification from the radio communication network 26 to which the macrocell base station or the neighboring femtocell base station belongs or through a request to the radio communication network 26, the management server 60 identifies the femtocell base station 50*a*, on which the radio communication terminal 30 is registered, based on the identification information (ESN) of the radio communication terminal 30 and transmits the UATI to the femtocell base station 50*a*.

Figure 19:
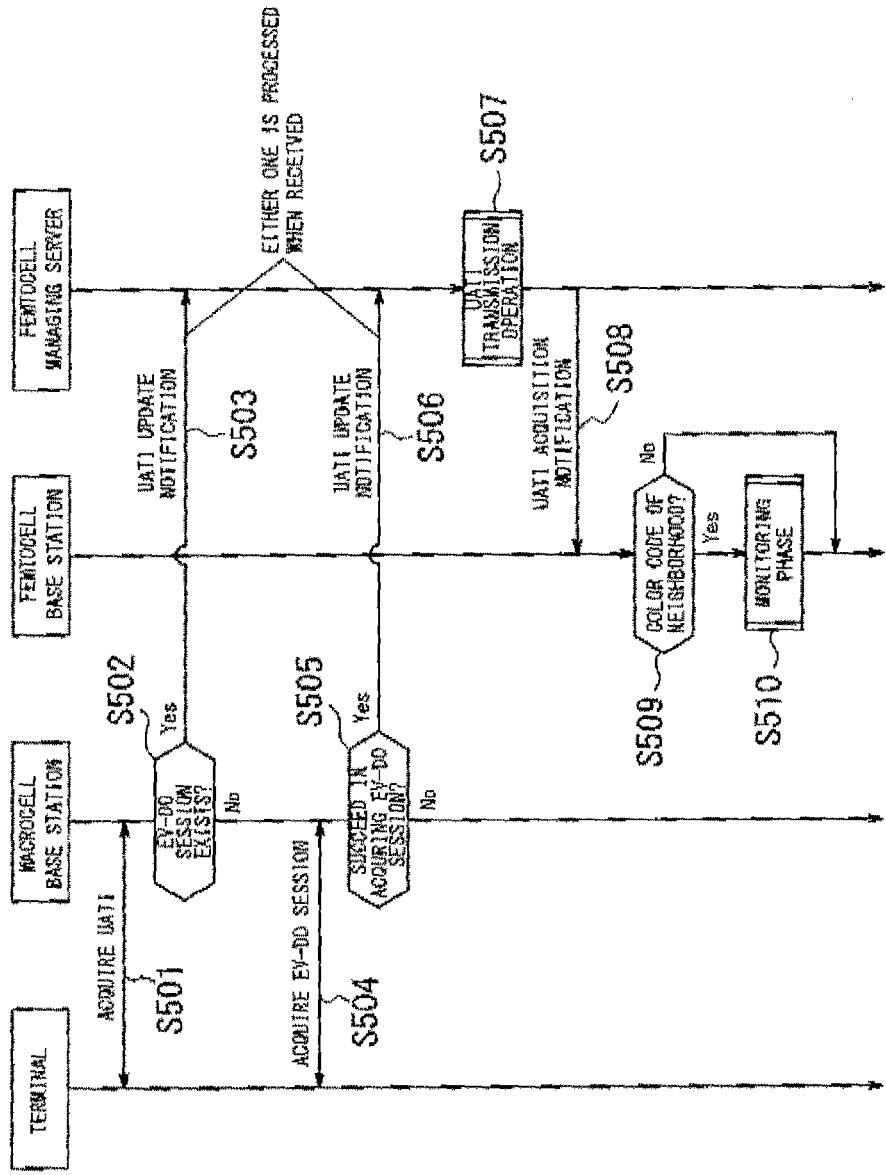
FIG. 19 is a sequence diagram illustrating details of operations performed when the femtocell base station is at the standby phase.

Next, a sequence diagram illustrating details of operations performed when the femtocell base station is at the standby phase is illustrated in FIG. 19.

The radio communication terminal 30 acquires the UATI from the macrocell base station 20 (S501), and, if there is the EV-DO session with the radio communication terminal 30 ("Yes" at step S502), or if there is the request for the EV-DO session (S504) and the EV-DO session with the radio communication terminal 30 is successfully acquired ("Yes" at S505), the macrocell base station 20 provides the UATI update notification to the management server 60 via the radio communication network 26 (S503, S506). It is assumed that the operations at steps S501-S503 relate to location registration and the like during handoff and the operations at steps S504-S506 relate to location registration and the like. FIG. 20 illustrates the information of the UATI update notification including the base station information on the macrocell base station, Color Code, Sector ID, the identification information (ESN and the like) of the radio communication terminal 30 and the UATI.

When the management server 60 receives the UATI update notification, the management server 60 performs UATI transmission processing (S507).

Figure 21:
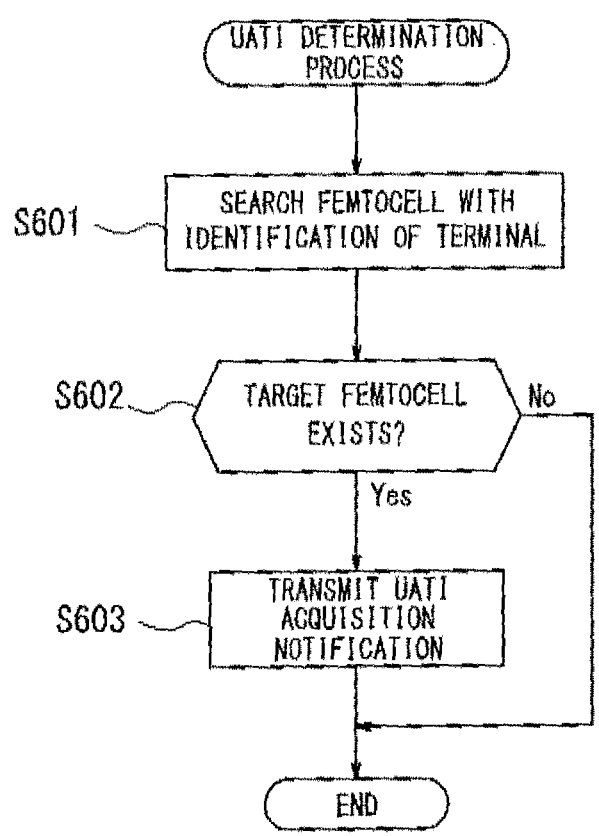
FIG. 21 is a flowchart of UATI transmission processing.

FIG. 21 illustrates a flowchart of the UATI transmission processing. When the management server 60 receives the UATI update notification, the management server 60 identifies the femtocell base station 50*a*, on which the radio communication terminal 30 is registered, based on the identification information (ESN) of the radio communication terminal 30 (S601). When the femtocell base station 50*a* is identified ("Yes" at S602), the management server 60 transmits the UATI acquisition notification to the femtocell base station 50*a* (S603). When the femtocell base station 50*a* is not identified ("No" at S602), the management server 60 ends the processing.

FIG. 22 illustrates information of the UATI acquisition notification. The UATI notification information includes Color Code of the macrocell base station, the identification information (ESN and the like) of the radio communication terminal 30 and the UATI.

When the femtocell base station 50*a* receives the UATI acquisition notification, the femtocell base station 50*a* determines whether the UATI is acquired from the macrocell base station in the neighborhood of the femtocell base station 50*a* or the neighboring femtocell base station based on Color Code in the information of the UATI acquisition notification and Color Code in the neighboring base station information registered on the memory unit 15. When it is determined that the UATI is acquired from the macrocell base station in the neighborhood of the femtocell base station 50*a* or the neighboring femtocell base station ("Yes" at S509), the femtocell base station 50*a* shifts to the monitoring phase described below (S510).

[Monitoring Phase]

Figure 23:
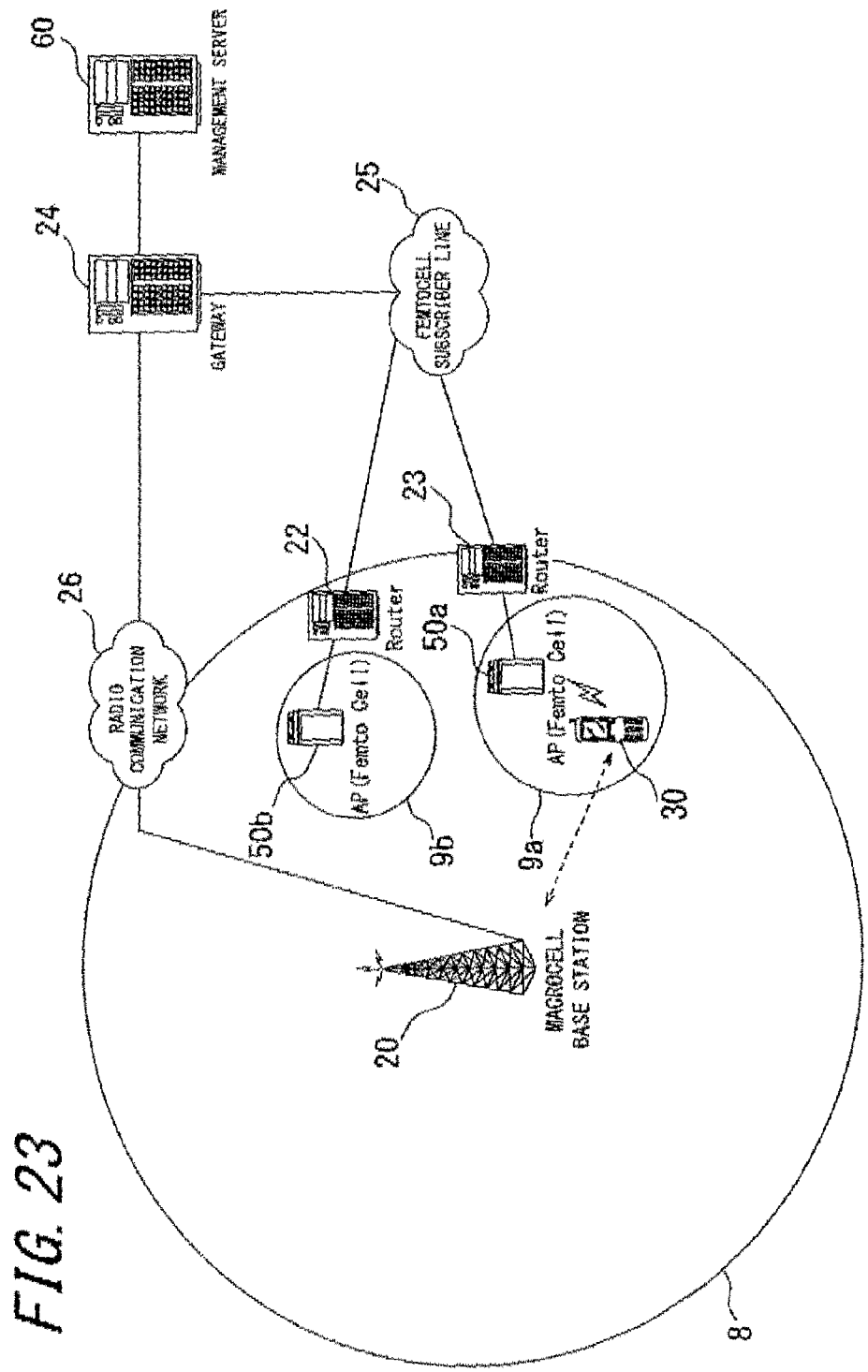
FIG. 23 is a diagram illustrating operations of the radio communication system when the femtocell base station is at the monitoring phase.

FIG. 23 is a diagram illustrating operations of the radio communication system when the femtocell base station is at the monitoring phase. At the monitoring phase, the femtocell base station 50*a* suspends the radio communication transmission unit 11 and activates the radio communication reception unit 12 and the wired communication unit 14. At the monitoring phase, the femtocell base station 50a activates the radio communication reception unit 12 to start monitoring the radio communication terminal 30.

Figure 24:
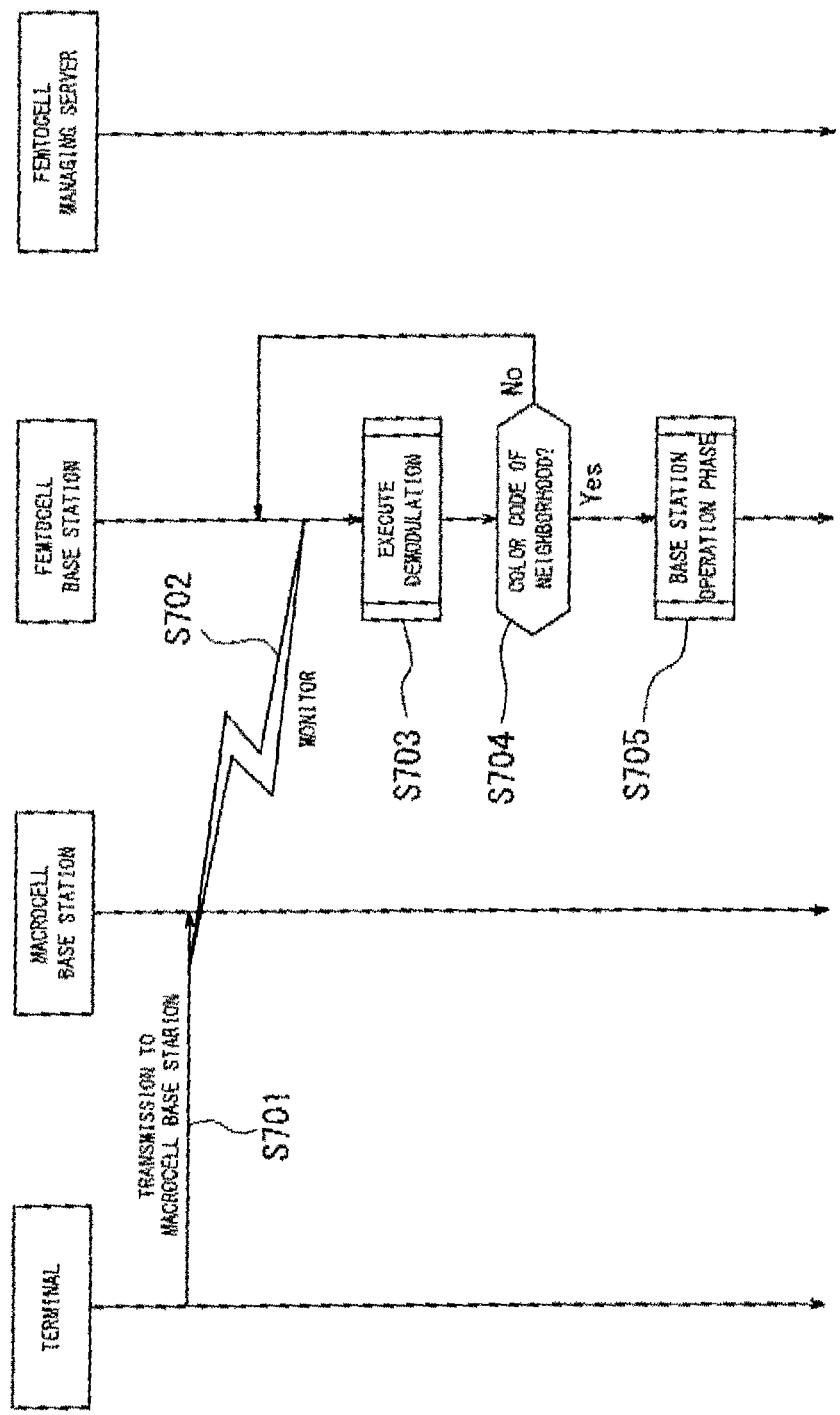
FIG. 24 is a sequence diagram illustrating details of operations performed when the femtocell base station is at the monitoring phase.

FIG. 24 is a sequence diagram illustrating details of operations performed when the femtocell base station is at the monitoring phase. As illustrated in FIG. 24, when the radio communication terminal 30 and the macrocell base station 20 are communicating with each other (S701), the femtocell base station 50a receives (monitors) the radio waves transmitted from the radio communication terminal 30 to the macrocell base station 20 (S702). Next, the femtocell base station 50a extracts the UATI from the radio waves received and executes demodulation based on the UATI (step S703). When demodulation is performed, it means that the radio waves are transmitted from the radio communication terminal 30 authorized to communicate. When demodulation is not performed and Color Code indicates a neighborhood ("Yes" at S704), the femtocell base station 50a proceeds to the base station operation phase (S705). When the demodulation is not performed ("No" at S704), the radio waves from the radio communication terminal 30 is being continuously received.

Figure 25:
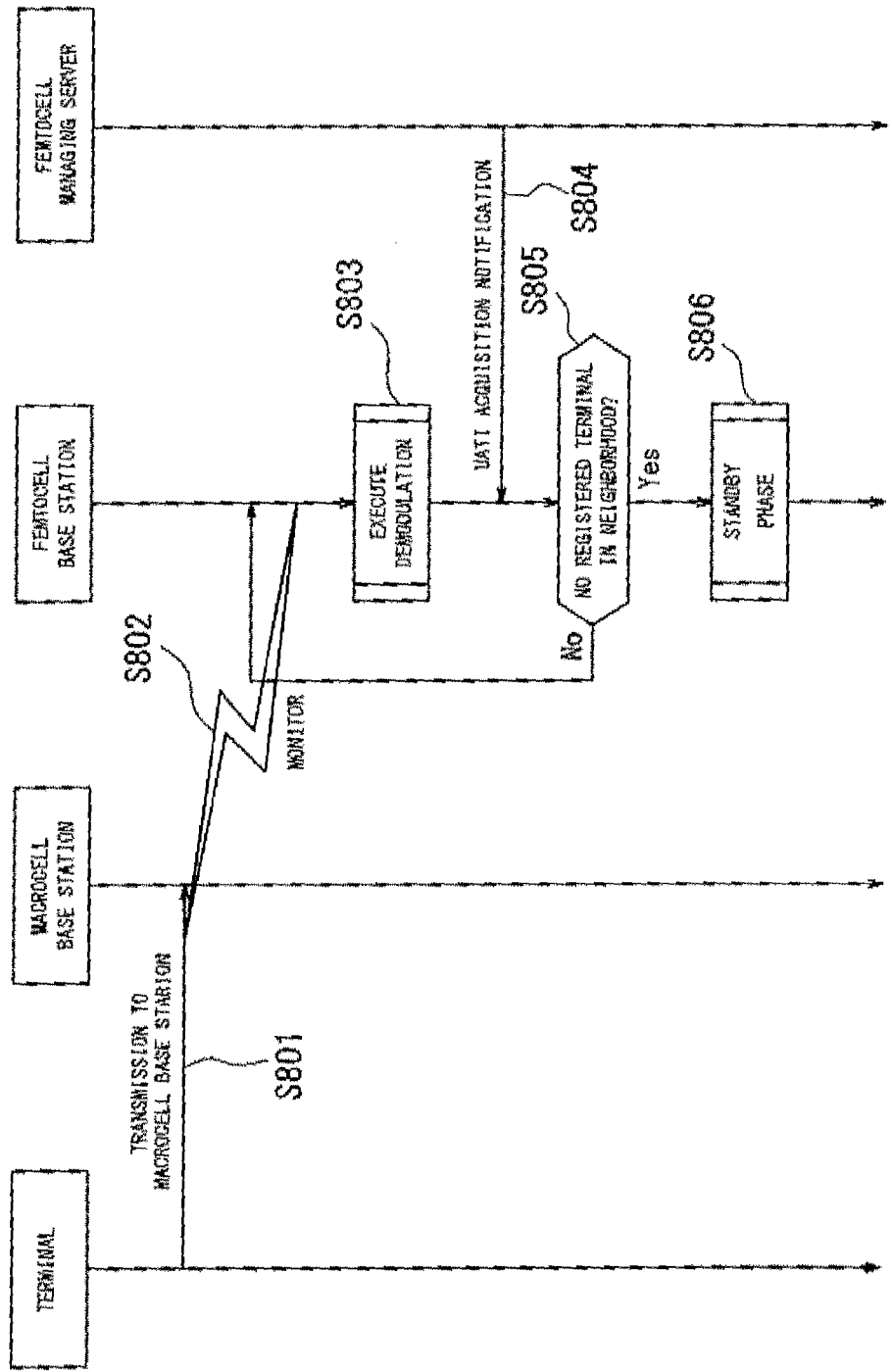
FIG. 25 is a sequence diagram of operations performed when the UATI acquisition notifications of all the radio communication terminals registered are received.

FIG. 25 is a sequence diagram of operations performed when the UATI acquisition notifications of all the radio communication terminals registered are received. Operations at S801-S803 are the same as those at S701-S703 in FIG. 24. At the monitoring phase, as illustrated in FIG. 25, the femtocell base station 50a receives the UATI acquisition notifications of all the registered radio communication terminals from the management server 60 managing the femtocell (S804). When it is determined that there is no registered radio communication terminals in the neighborhood ("Yes" at S805), the femtocell base station 50a suspends monitoring of the radio communication terminal 30 described, above and proceeds to the standby phase (S806).

The femtocell base station 50a demodulates the radio waves transmitted from the radio communication terminal 30 based on the MI and the MQ. FIG. 12 illustrates the example of the MI and FIG. 13 illustrates the example of the MQ. A0-A31 in FIG. 12 and FIG. 13 represent the bits of the UATI acquired.

[Base Station Operation Phase]

At the base station operation phase, the femtocell base station 50a activates the radio communication transmission unit 11, the radio communication reception unit 12 and the wired communication unit 14.

At the base station operation phase, the femtocell base station 50a activates the radio communication transmission unit 11 to start transmission of the radio waves and operates as the base station. When there is no longer the radio communication terminal 30 in the standby state, the femtocell base station 50a proceeds to the monitoring phase described above.

According to the second embodiment, as described above, the femtocell base station starts monitoring the radio waves transmitted from the radio communication terminal authorized to communicate when the radio communication terminal is in the neighborhood of the femtocell. Accordingly, more effective power consumption is enabled than a case that the radio waves are monitored even though the radio communication terminal is distant from the femtocell.

Third Embodiment

Figure 26:
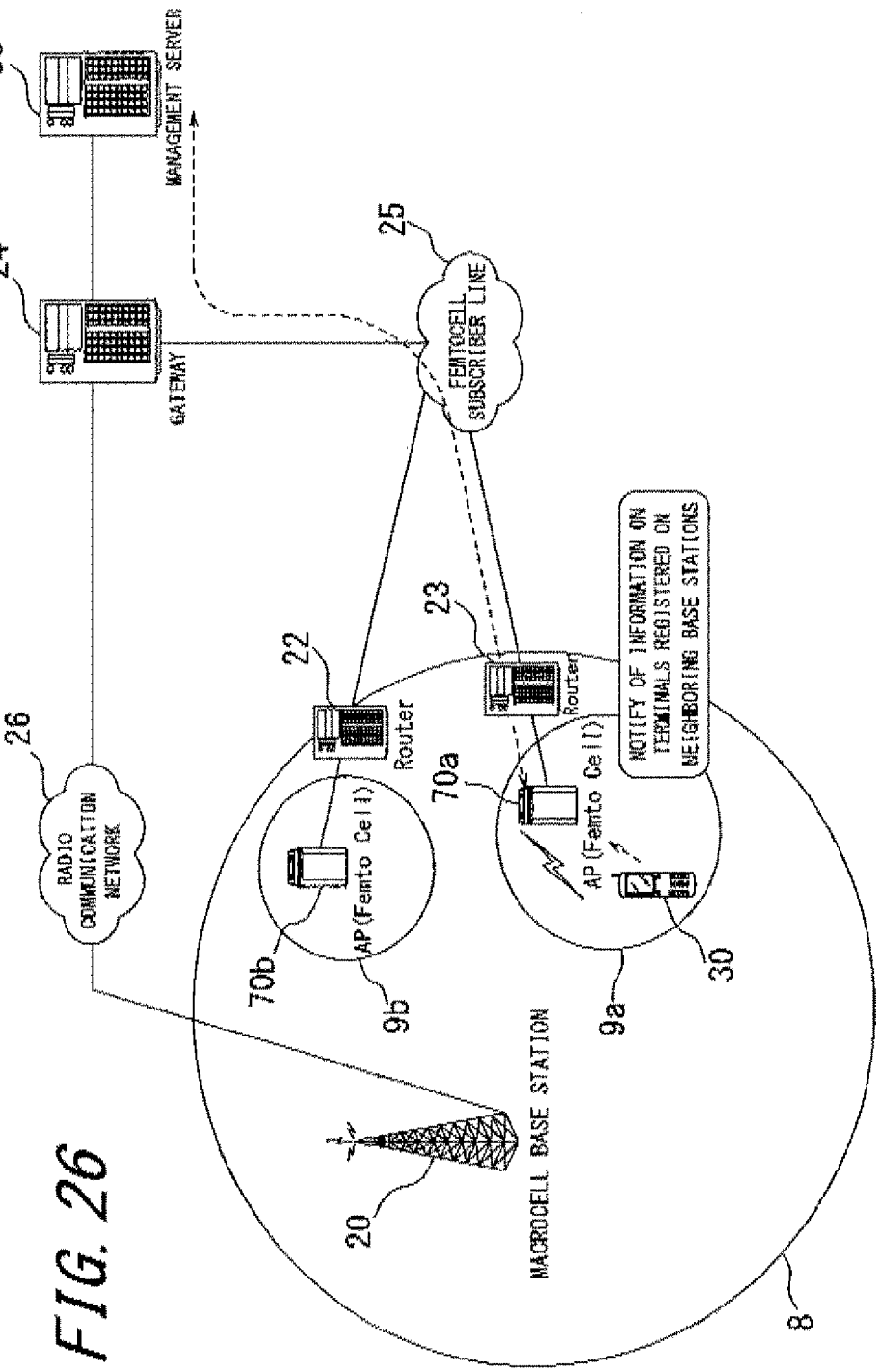
FIG. 26 is a configuration diagram of a radio communication system according to a third embodiment of the present invention.

FIG. 26 is a configuration diagram of a radio communication system according to a third embodiment of the present invention. The radio communication system illustrated in FIG. 26 includes femtocell base stations (narrow-area base stations) 70a and 70b having the femtocells 9a and 9b as respective communication areas, the macrocell base station (wide are base station) 20 having the macrocell 8 (wide area) as the communication area including the femtocells 9a and 9b (narrow areas), and the radio communication network 26 connected to the macrocell base station 20. According to the present embodiment, the radio communication network 26 is in conformity with "CDMA2000 1xEV-DO". To distinguish between the femtocell base stations, the femtocell base stations are referred to as the femtocell base station 70a or the femtocell base station 70b. Otherwise, the femtocell base stations are referred to as femtocell base stations 70.

The radio communication system illustrated in FIG. 26 thither includes the routers 23 and 22 connected to the femtocell base stations 70a and 70b, respectively, the femtocell subscriber line 25 connected to the routers 23 and 22, the gateway 24 connected to the femtocell subscriber line 25 and the radio communication network 26, and a management server 80 connected to the gateway 24. The management server 80 has the OAM (Operation And Maintenance) function and manages, for example, information on the femtocells 9a and 9b and the femtocell base stations 70a and 70b.

In addition, the radio communication terminal 30 is authorized to communicate with the femtocell base station 70a and thus regarded as the accommodation object of the femtocell base station 70a.

Figure 27:
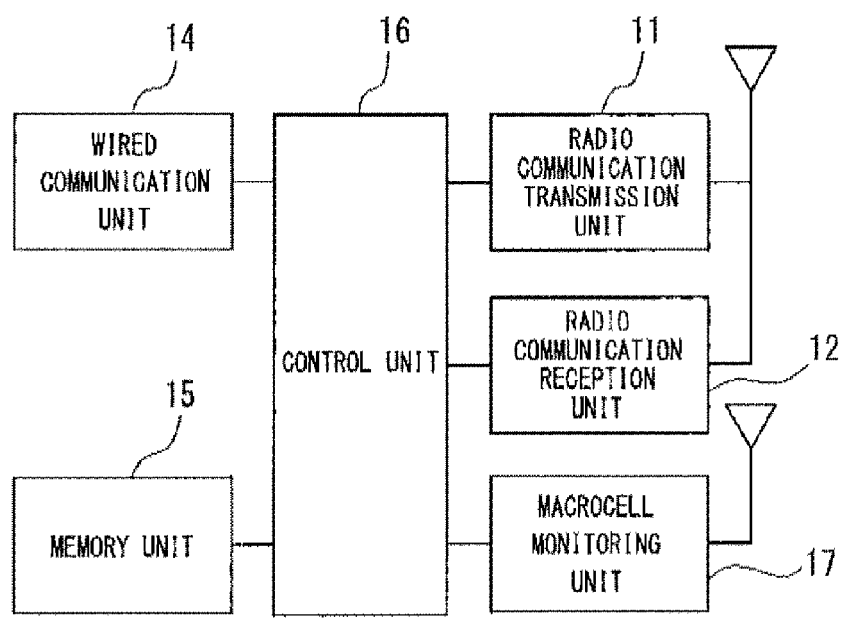
FIG. 27 is a block diagram of a femtocell base station.

FIG. 27 is a block diagram of the femtocell base station. The femtocell base station 70 has a configuration including the radio communication transmission unit 11, the radio communication reception unit 12, the macrocell monitoring unit 17, the wired communication unit 14, the memory unit 15 and the control unit 16. The radio communication transmission unit 11 transmits the radio waves to the radio communication terminal of the accommodation object. The radio communication reception unit 12 receives the radio waves from the radio communication terminal of the accommodation object. The wired communication unit 14 communicates with the management server 80. The macrocell monitoring unit 17 monitors the macrocell base station 20 in the neighborhood of the femtocell base station 70 and acquires the neighboring base station information of the macrocell base station 20.

The memory unit 15 may be the storage medium such as the flash memory or the hard disk. The control unit 16 may be the CPU or the like.

The control unit 16 pre-registers the identification information (ESN and the like) of the radio communication terminal of the accommodation object on the memory unit 15. In addition, the control unit 16 notifies the management server 80 of the neighboring base station information of the macrocell base station 20 in the neighborhood of the femtocell base station 70 of itself and the identification information (ESN and the like) of the radio communication terminal 30.

The control unit 16 controls transmission of the radio waves by the radio communication transmission unit 11 and monitoring of the radio waves by the radio communication reception unit 12.

In addition, when the locations of not all the radio communication terminals of the accommodation object are registered, the control unit 16 controls the radio communication transmission unit 11 to suspend transmission of the radio waves and the radio communication reception unit 12 to suspend monitoring of the radio waves. When it is notified from the management server 80 managing the base station that the radio communication terminal is within the area of the same radio area information (Color Code) as the femtocell base station 70, the control unit 16 controls the radio communication reception unit 12 to start monitoring the radio waves from the radio communication terminal.

Figure 28:
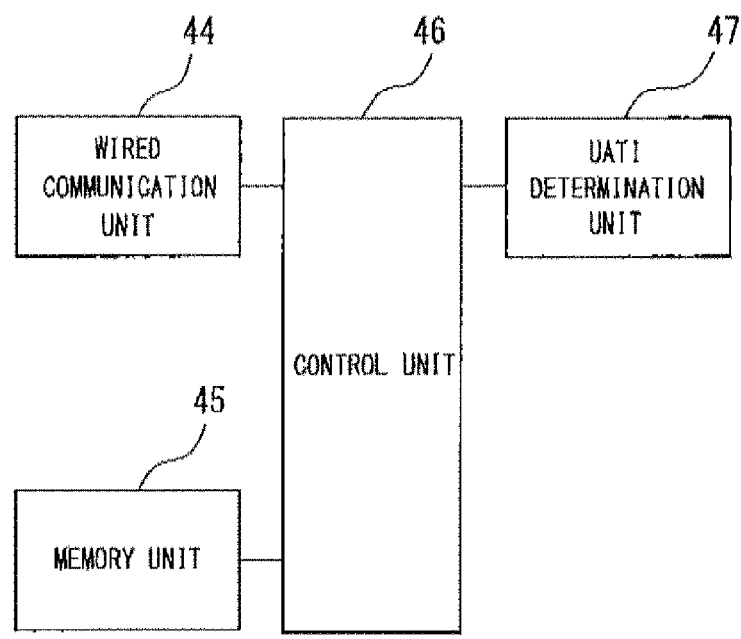
FIG. 28 is a block diagram of a management server.

FIG. 28 is a block diagram of the management server. The management server 80 has a configuration including a UATI (Unicast Access terminal identifier) determination unit 47, the wired communication unit 44, the memory unit 45 and the control unit 46. The UATI determination unit 47 determines whether the radio communication terminal 30 in communication with the macrocell base station 20 is within the area of the same radio area information as the femtocell base station 70 based on the radio area information acquired from the macrocell base station 20. The wired communication unit 44 communicates with the macrocell base station 20 and the femtocell base station 70. The memory unit 45 may be the storage medium such as the hard disk or the flash memory. The control unit 46 may be the CPU or the like.

Next, operations of the femtocell base station according to the third embodiment will be described. According to the third embodiment, in the same manner as the first embodiment, the operations of the femtocell base station are classified into the four phases: the preparation phase, the standby phase, the monitoring phase and the base station operation phase.

[Preparation Phase]

At the preparation phase, as illustrated in FIG. 26, the femtocell base station 70a acquires the neighboring base station information of the macrocell base station 20 in the neighborhood of the femtocell base station 70a. In addition, the femtocell base station 70a registers the identification information (ESN and the like) of the radio communication terminal 30 authorized to communicate with the femtocell base station 70a. Further, the femtocell base station 70a informs the management server 80 of the neighboring base station information and the identification information (ESN and the like) of the radio communication terminal 30.

Figure 29:
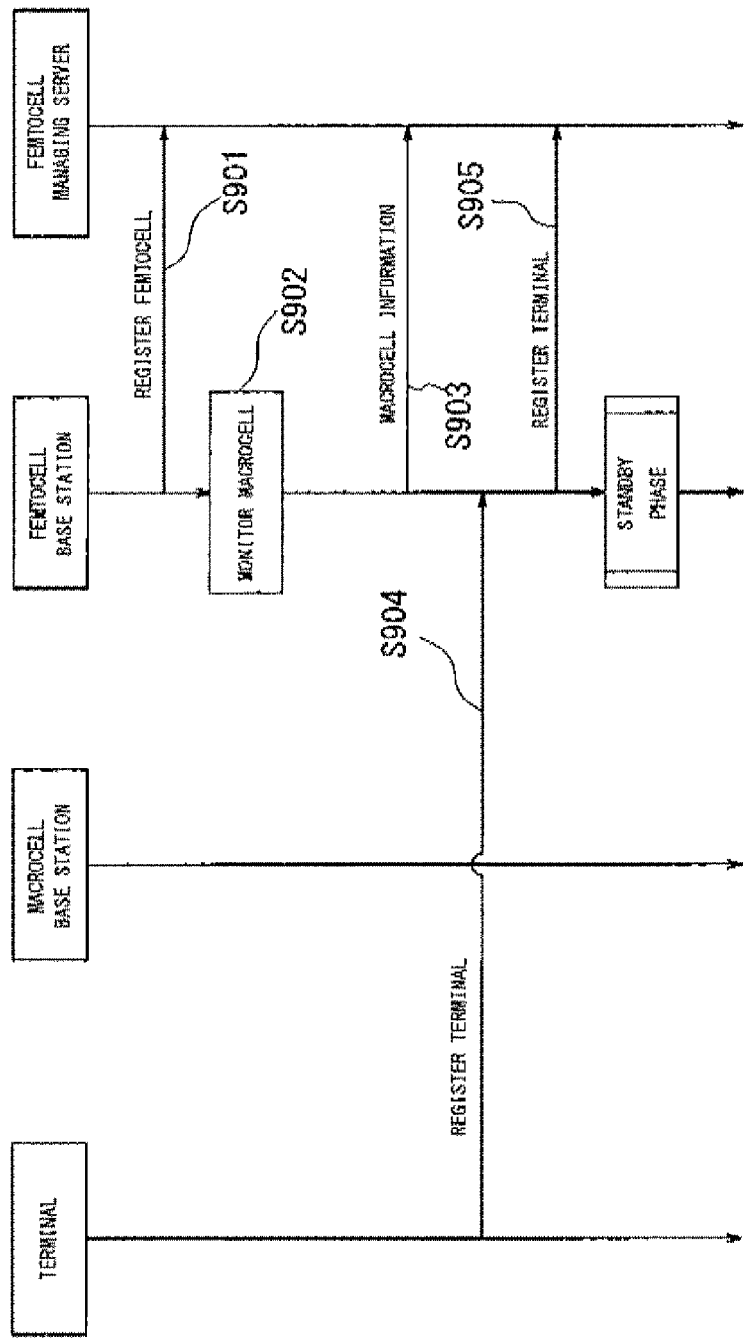
FIG. 29 is a sequence diagram of operations performed when the femtocell base station is at the preparation phase.

Next, a sequence diagram illustrating details of operations performed when the femtocell base station is at the preparation phase is illustrated in FIG. 29.

The femtocell base station 70a registers the femtocell registration information on the management server 80 (S901). The femtocell registration information registered on the management server 80 includes the identification information and the IP address of the femtocell base station 70a.

The femtocell base station 70a acquires the notification information of the macrocell base station in the neighborhood of the femtocell base station 70a and the neighboring femtocell base station by using its function to monitor the macrocell base station and the neighboring femtocell base station (S902) and provides the notification information of the neighboring base station to the management server 80 (S903). Or, the management server 80 acquires the notification information of the neighboring base station from those base stations, and the femtocell base station 70a acquires the notification information of the neighboring base station from the management server 80. Examples of the notification information are Band Class, Channel and PN for monitoring and Color Code and Sector ID for demodulation. The femtocell base station 70 performs time synchronization with the neighboring macrocell base station 20 by using GPS and NTP and is in sync therewith in demodulation.

The femtocell base station 70a acquires and registers the identification information (ESN and the like) of the radio communication terminal 30 authorized to communicate from the radio communication terminal 30 (S904). Now the radio communication terminal 30 is regarded as the accommodation object of the femtocell base station 70a. The radio communication terminal 30 may be the accommodation object of each of the femtocell base stations 70a and 70b. In addition, the femtocell base station 70a registers the identification information (ESN and the like) of the registered radio communication terminal 30 on the management server 80 (S905). At this time, the management server 80 associates the identification information of the radio communication terminal 30 and the femtocell base station 70a.

[Standby Phase]

Figure 30:
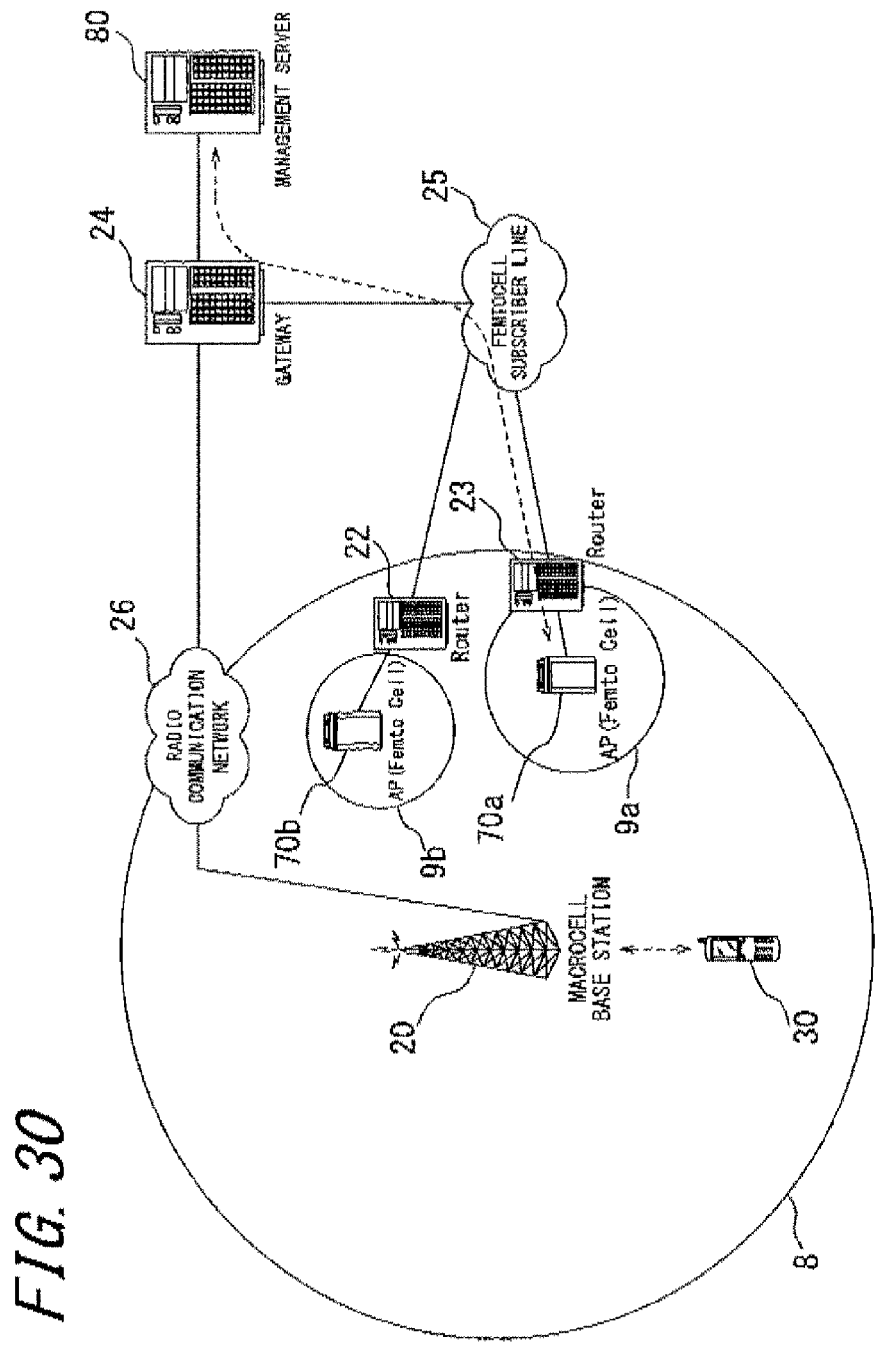
FIG. 30 is a diagram illustrating operations of the radio communication system when the femtocell base station is at the standby phase.

FIG. 30 is a diagram illustrating operations of the radio communication system when the femtocell base station is at the standby phase. At the standby phase, the femtocell base station 70a suspends the radio communication transmission unit 11 and the radio communication reception unit 12 and activates the wired communication unit 14, thus being at a state to wait for the UATI acquisition notification.

When the management server 80 acquires the information on the UATI (Unicast Access terminal identifier) acquired by the radio communication terminal 30 through the notification from the radio communication network 26 to which the macrocell base station or the neighboring femtocell base station belongs or through the request to the radio communication network 26, the management server 80 identifies the femtocell base station 70a, on which the radio communication terminal 30 is registered, based on the identification information (ESN) of the radio communication terminal 30 and transmits the UATI to the femtocell base station 70a.

Figure 31:
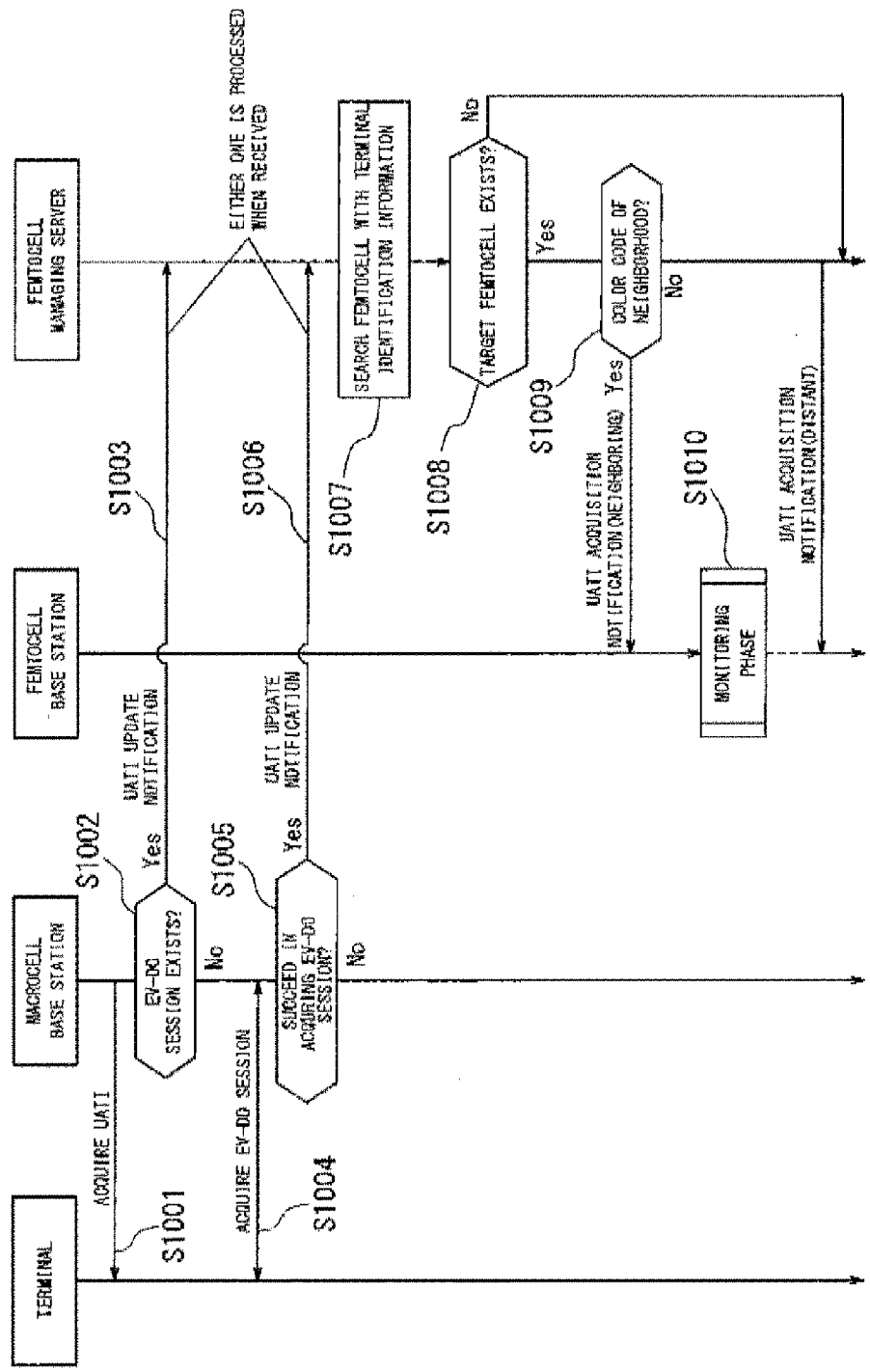
FIG. 31 is a sequence diagram of operations performed when the femtocell base station is at the standby phase.

Next, a sequence diagram illustrating details of operations performed when the femtocell base station is at the standby phase is illustrated in FIG. 31.

The radio communication terminal 30 acquires the UATI from the macrocell base station (S1001), and, if there is the EV-DO session with the radio communication terminal 30 ("Yes" at step S1002), or if there is the request to obtain the EV-DO session (S1004) and the EV-DO session with the radio communication terminal 30 is successfully acquired ("Yes" at S1005), the macrocell base station provides the UATI update notification to the management server 80 via the radio communication network 26 (S1003, S1006). It is assumed that the operations at steps S1001-S1003 relate to location registration and the like during handoff, and that the operations at steps S1004-S1006 relate to location registration and the like. FIG. 32 illustrates the information of the UATI update notification including the base station information on the macrocell base station, Color Code, Sector ID, the identification information (ESN and the like) of the radio communication terminal 30 and the UATI.

The management server 80 identifies the femtocell base station 70a, on which the radio communication terminal 30 is registered, based on the identification information (ESN) of the radio communication terminal 30 (S1007). When the femtocell base station 70a is identified ("Yes" at S1008) and, based on Color Code (radio area information) which enables identification of the communication area, the UATI is identified as the one acquired from the macrocell base station in the neighborhood of the identified femtocell base station or the neighboring femtocell base station ("Yes" at S1009), a UATI acquisition notification (neighboring) is provided to the identified femtocell base station. For example, the management server 80 preliminarily possess Color Code (acquired from the notification information described above, for example) of each of the femtocell base stations and, when Color Code of the UATI corresponds to Color Code of the identified femtocell base station, "Yes" at S1009 is applied. When the UATI is acquired from the non-neighboring macrocell base station or femtocell base station ("No" at S1009), a UATI acquisition notification (distant) is transmitted. When the femtocell base station receives the UATI acquisition notification (neighboring), the femtocell base station proceeds to the monitoring phase described below (S1010).

FIG. 33 illustrates information in the UATI acquisition notification (neighboring) and FIG. 34 illustrates information in the UATI acquisition notification (distant). The UATI acquisition notifications include Color Code of the macrocell base station, the identification information (ESN and the like) of the radio communication terminal 30 and the UATI.

[Monitoring Phase]

Figure 35:
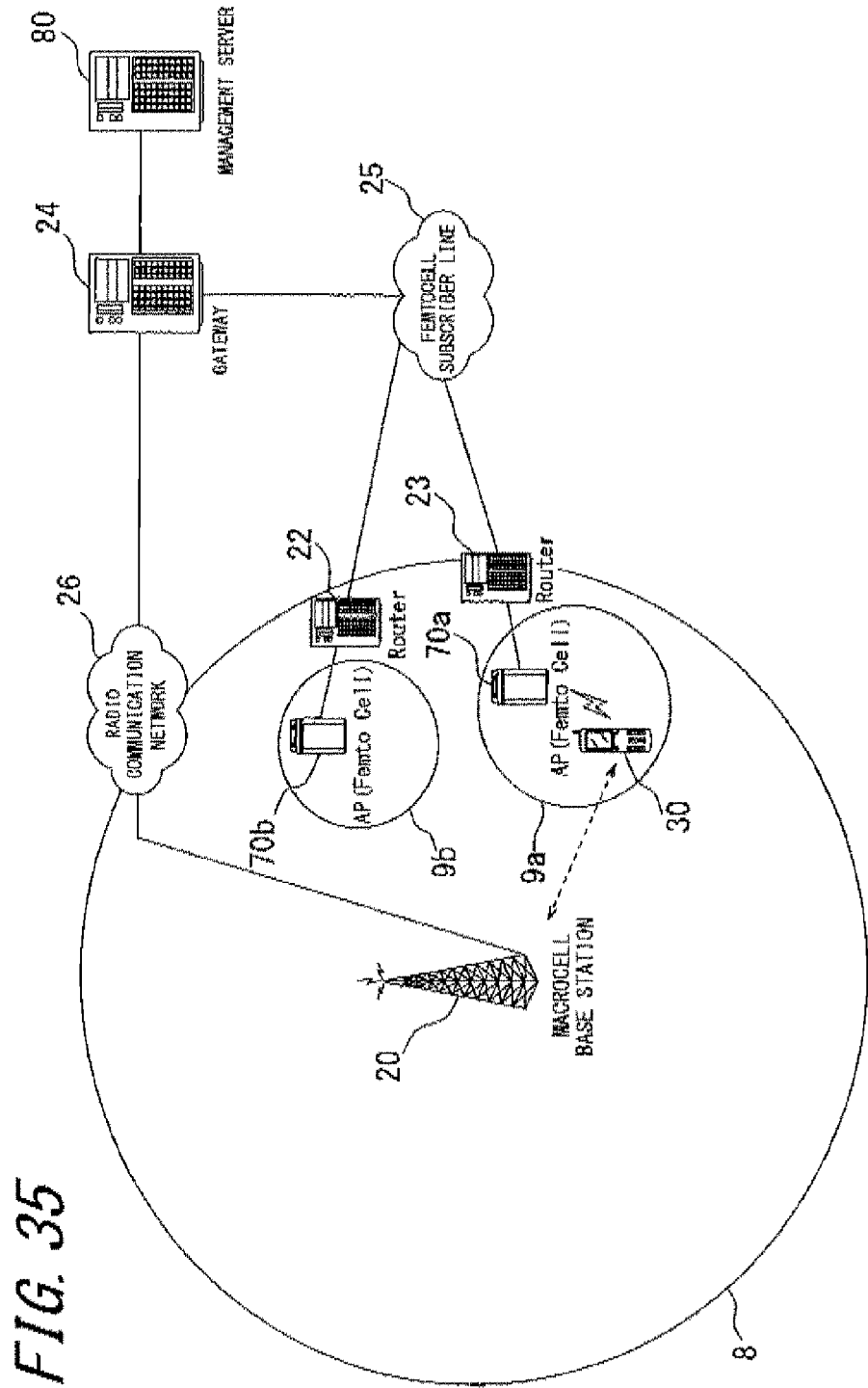
FIG. 35 is a diagram illustrating operations of the radio communication system when the femtocell base station is at the monitoring phase.

FIG. 35 is a diagram illustrating operations of the radio communication system when the femtocell base station is at the monitoring phase. At the monitoring phase, the femtocell base station 70a suspends the radio communication transmission unit 11 and activates the radio communication reception unit 12 and the wired communication unit 14. At the monitoring phase, the femtocell base station 70a activates the radio communication reception unit 12 to start monitoring the radio communication terminal 30.

Figure 36:
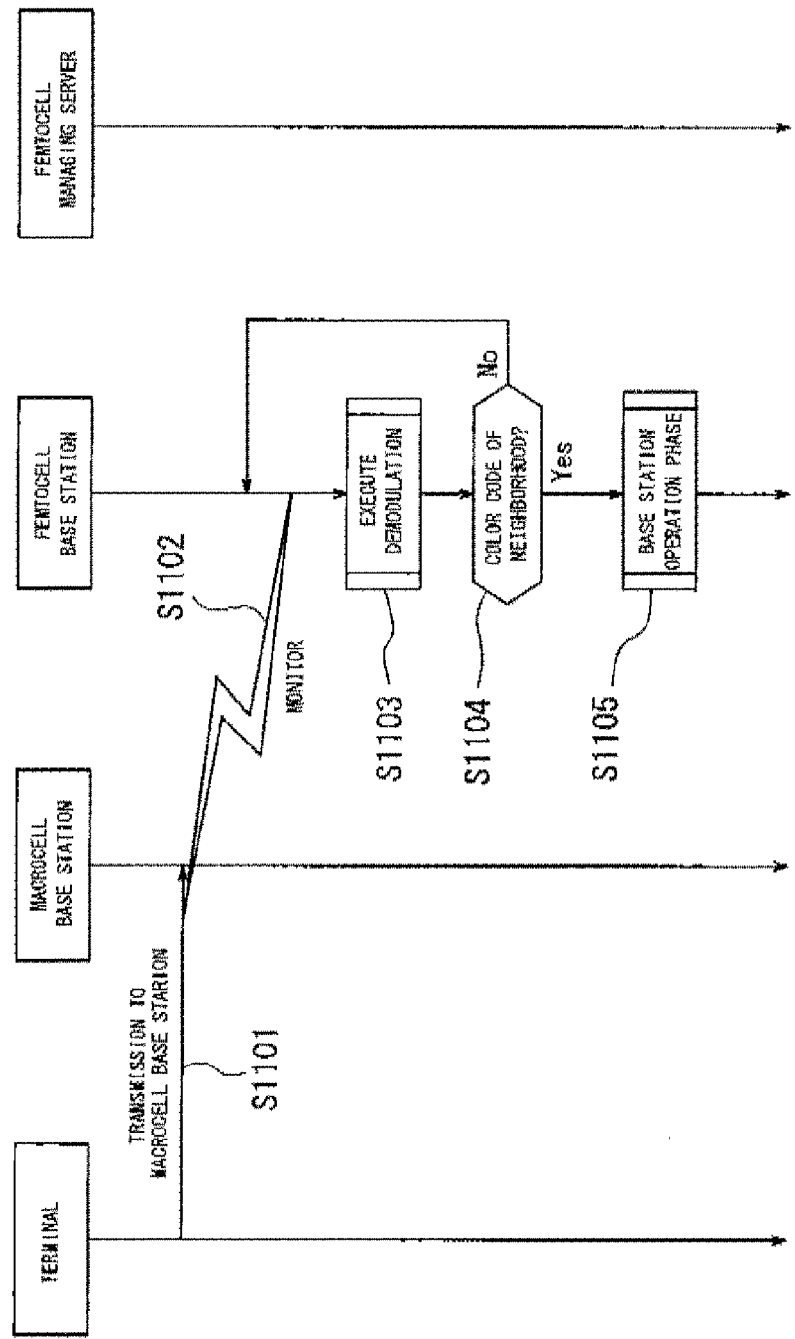
FIG. 36 is a sequence diagram of operations performed when the femtocell base station is at the monitoring phase.

FIG. 36 is a sequence diagram illustrating details of operations performed when the femtocell base station is at the monitoring phase. As illustrated in FIG. 36, when the radio communication terminal 30 and the macrocell base station 20 are communicating with each other (S1101), the femtocell base station 70a receives (monitors) the radio waves transmitted from the radio communication terminal 30 to the macrocell base station 20 (S1102). Next, the femtocell base station 70a extracts the UATI from the radio waves received and executes demodulation based on the UATI (step S1103). When demodulation is performed, it means that the radio waves are transmitted from the radio communication terminal 30 authorized to communicate. When demodulation is performed and Color Code indicates a neighborhood ("Yes" at S1104), the femtocell base station 70a proceeds to the base station operation phase (S1105).

Figure 37:
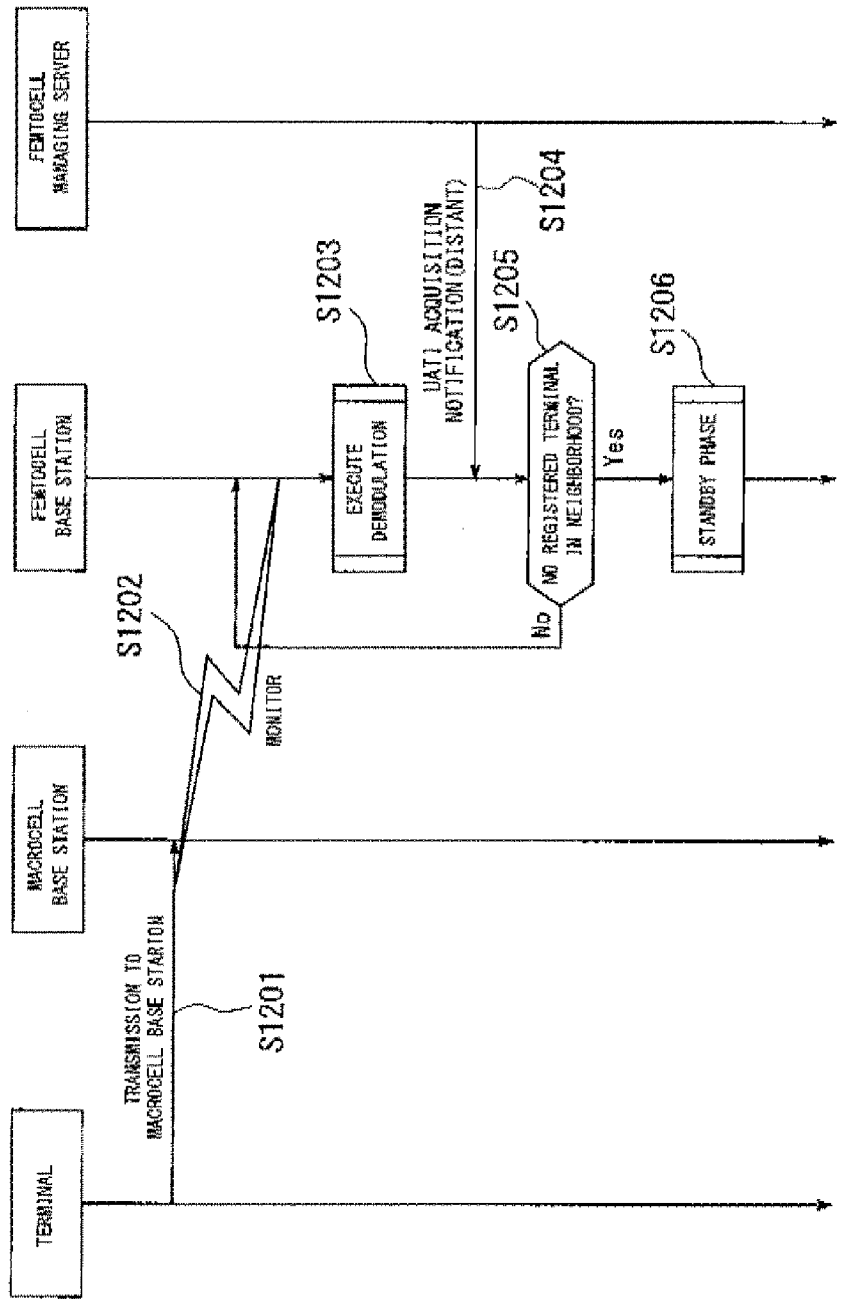
FIG. 37 is a sequence diagram of operations performed when the UATI acquisition notification (distant) is received.
Figure 38:
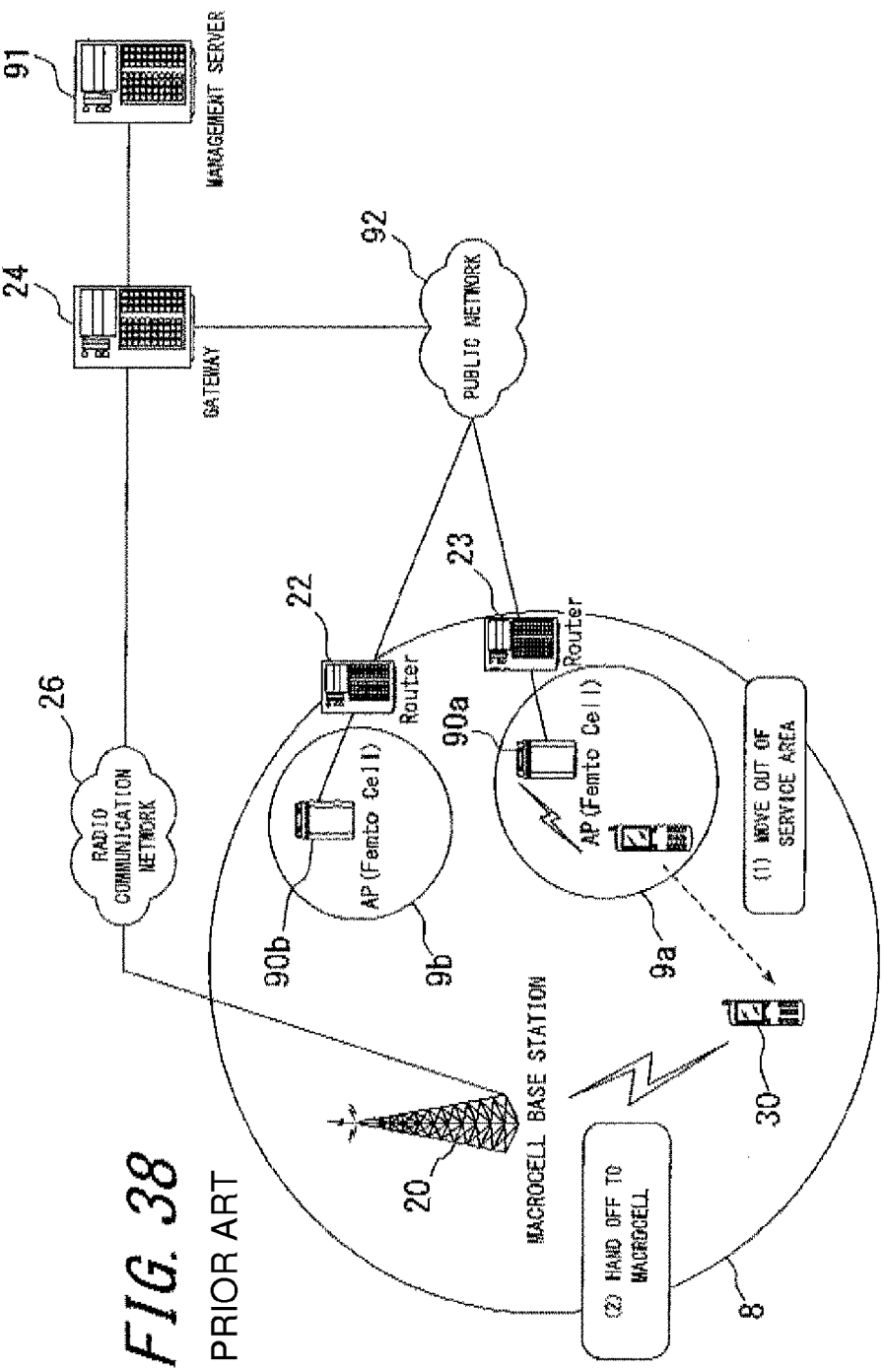
FIG. 38 is a diagram illustrating a conventional radio communication system.
Figure 39:
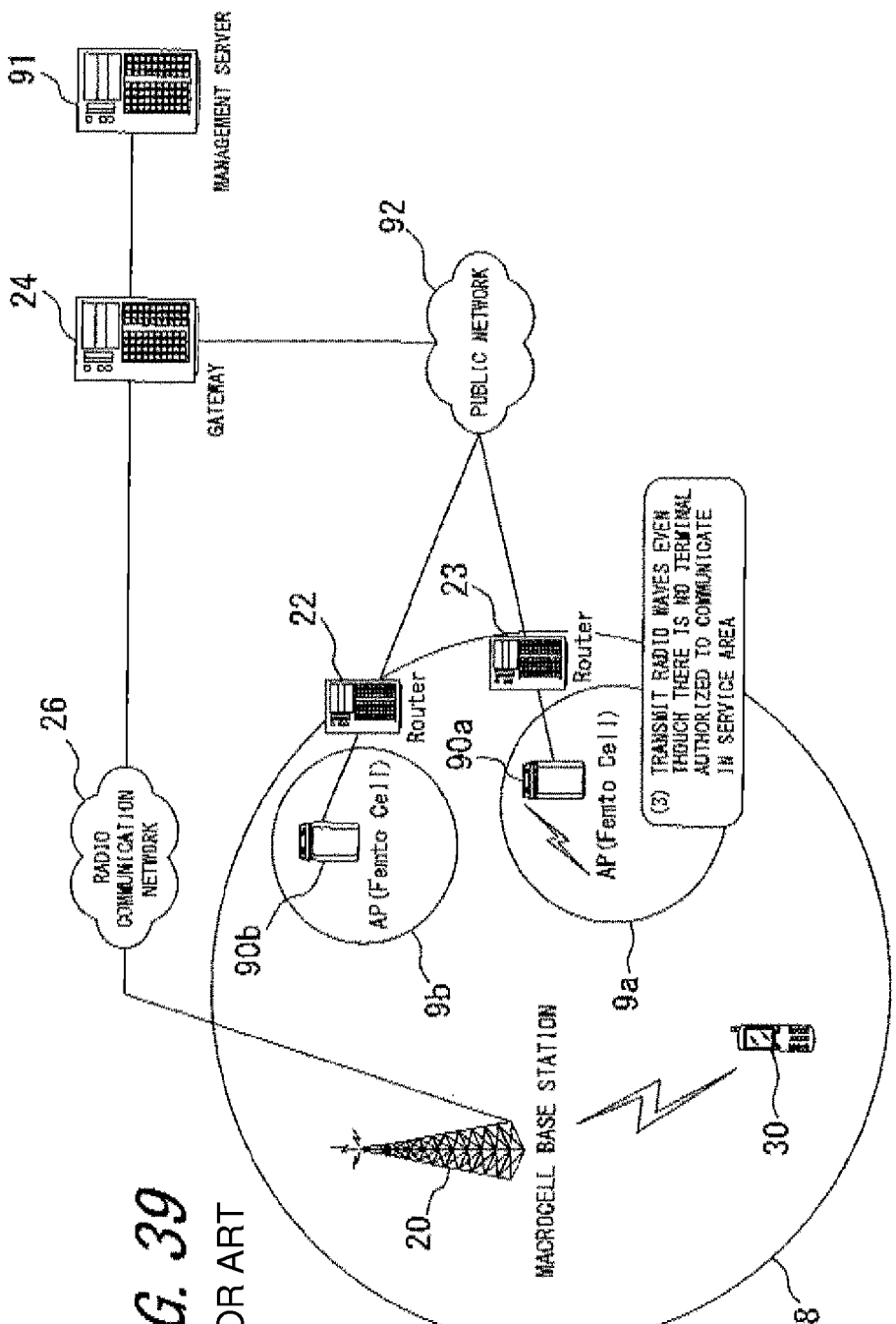
FIG. 39 is a diagram illustrating the conventional radio communication system.

FIG. 37 is a sequence diagram illustrating operations performed when the UATI acquisition notification (distant) is received. Operations at S1201-S1203 are the same as those at S1101-S1103 in FIG. 36. At the monitoring phase, as illustrated in FIG. 37, the femtocell base station 70a receives the UATI acquisition notifications (distant) of all the radio communication terminals registered from the management server 80 managing the femtocell (S1204) and, when determining that there is no registered radio communication terminals in the neighborhood ("Yes" at S1205), suspends monitoring of the radio communication terminal 30 described above and proceeds to the standby phase (S1206).

The femtocell base station 70a demodulates the radio waves transmitted from the radio communication terminal 30 based on the MI and the MQ. FIG. 12 illustrates the example of the MI and FIG. 13 illustrates the example of the MQ. A0-A31 in FIG. 12 and FIG. 13 represent the bits of the UATI acquired.

[Base Station Operation Phase]

At the bas station operation phase, the femtocell base station 70a activates the radio communication transmission unit 11, the radio communication reception unit 12 and the wired communication unit 14.

At the base station operation phase, the femtocell base station 70a activates the radio communication transmission unit 11 to start transmission of the radio waves and operates as the base station. When there is no longer the radio communication terminal 30 in the standby state, the femtocell base station 70a proceeds to the monitoring phase described above.

According to the present embodiment, as described above, the femtocell base station starts monitoring the radio waves transmitted from the radio communication terminal authorized to communicate when the radio communication terminal is in the neighborhood of the femtocell. Accordingly, more effective power consumption is enabled than the case that the radio waves are monitored even though the radio communication terminal is distant from the femtocell.

REFERENCE SIGNS LIST 8 macrocell
9a, 9b femtocell
10a, 10b, 50a, 50b, 70a, 70b femtocell base station
11 radio communication transmission unit
12 radio communication reception unit
13, 47 UATI determination unit
14, 44 wired communication unit
15, 35, 45 memory unit
16, 36, 46 control unit
17 macrocell monitoring unit
20 macrocell base station
22, 23 router
24 gateway
25 femtocell subscriber line
26 radio communication network
30 radio communication terminal
33 message generation unit
34 radio communication unit
40, 60, 80 management server
43 UATI transmission unit

The invention claimed is:

1. A base station apparatus for a narrow-area base station which communicates in a narrow area within a wide area allowing for a communication with a wide-area base station, comprising:
  a radio communication reception unit configured to receive radio waves from a radio communication terminal of an accommodation object;
  a control unit configured to control reception of the radio waves by the radio communication reception unit;
  a wired communication unit configured to communicate with a server managing the base station; and
  a determination unit configured to determine whether the radio communication terminal of the accommodation object in communication with a wide-area base station base station is within an area corresponding to the same radio area information as the narrow-area base station based on the radio area information acquired through the wired communication unit, wherein
  the control unit controls the radio communication reception unit to start receiving the radio waves from the radio communication terminal when the determination unit determines that the radio communication terminal is within the area of the same radio area information as the narrow-area base station.

2. The base station apparatus according to claim 1, wherein the control unit acquires the radio area Information from the radio communication terminal of the accommodation object via a wide-area base station in communication with the radio communication terminal through the wired communication unit.

3. The base station apparatus according to claim 1, wherein the control unit
  acquires the radio area information from the server managing the wide-area base station in communication with the radio communication terminal of the accommodation object through the wired communication unit.

4. The base station apparatus according to claim 1, wherein the control unit acquires the radio area information through the wired communication unit when a location of the radio communication terminal of the accommodation object is registered.

5. The base, station apparatus according to claim 1, wherein, when the determination unit determines that the radio communication terminal is not within the area of the same radio area information as the self base station, the control unit controls the radio communication reception unit to suspend reception of the radio waves from the radio communication terminal.

6. A management server configured to manage a narrow-area base station communicating in a narrow area within a wide area allowing for a communication with a wide-area base station, comprising:
- a control unit configured to control a correspondence relationship between a radio communication terminal and the narrow-area base station accommodating the radio communication terminal;
- a wired communication unit configure to communicate with the wide-area base station and the narrow-area base station; and
- a determination unit configured to determine whether the radio communication terminal in communication with the wide-area base station is within an area of the same radio area information as the narrow-area base station based on the radio area information acquired from the wide-area base station, wherein
- the control unit, when the determination unit determines that the radio communication terminal is within the area of the same radio area information as the narrow-area base station, notifies the narrow-area base station that the radio communication terminal is within the area of the same radio area information as the narrow-area base station such that the narrow-area base station starts receiving radio waves from the radio communication terminal.

7. The management server according to claim 6, wherein the determination unit determines that the radio communication terminal of the accommodation object of a plurality of narrow-area base stations is within the area of the same radio area information as the narrow-area base station.

8. The management server according to claim 6, wherein the control unit acquires the radio area information from the wide-area base station through the wired communication unit when the location of the radio communication terminal is registered.

9. A base station apparatus for a narrow-area base station communicating in a narrow area within a wide area allowing for a communication with a wide-area base. station, comprising:
- a radio communication reception unit configured to receive radio waves from a radio communication terminal of an accommodation object;
- a control unit configured to control reception of the radio waves by the radio communication reception unit; and
- a wired communication unit configured to communicate with a management server configured to manage the narrow-area base station, wherein
- the control unit controls the radio communication reception unit to suspend reception of the radio waves when the location of the radio communication terminal of the accommodation object is not registered and controls the radio communication reception unit to start receiving the radio waves from the radio communication terminal when being notified from the management server through the wired communication unit that the radio communication terminal is within the area of the same radio area information as the narrow area base station.

10. The base station apparatus according to claim 9, wherein the control unit, when being notified from the management server through the wired communication unit that the radio communication terminal is not within the area of the same radio area information as the narrow area base station, controls the radio communication reception unit to suspend reception of the radio waves from the radio communication terminal.

\* \* \* \* \*